(12) United States Patent
Chen et al.

(10) Patent No.: US 8,780,797 B2
(45) Date of Patent: Jul. 15, 2014

(54) UNIVERSAL INTEGRATED CIRCUIT CARD ACTIVATION IN A HYBRID NETWORK

(75) Inventors: Xuming Chen, San Ramon, CA (US); Lawrence S. Rybar, Basking Ridge, NJ (US); Bhaskar Srinivasiah, Atlanta, GA (US); Praveen Venkataramu, Bridgewater, NJ (US); Bjorn Hjelm, Livermore, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 325 days.

(21) Appl. No.: 12/916,305

(22) Filed: Oct. 29, 2010

(65) Prior Publication Data

US 2012/0106443 A1 May 3, 2012

(51) Int. Cl.
| | |
|---|---|
| *H04W 4/00* | (2009.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC .......................................... 370/328; 370/252

(58) Field of Classification Search
None
See application file for complete search history.

(56) References Cited

U.S. PATENT DOCUMENTS

| | | | |
|---|---|---|---|
| 2005/0009520 A1* | 1/2005 | Herrero et al. | 455/435.1 |
| 2010/0227591 A1* | 9/2010 | Park et al. | 455/411 |
| 2011/0092253 A1* | 4/2011 | Amiel et al. | 455/558 |
| 2011/0280166 A1* | 11/2011 | Nien et al. | 370/310 |

\* cited by examiner

*Primary Examiner* — Faruk Hamza
*Assistant Examiner* — Diane Lo

(57) ABSTRACT

A universal integrated circuit card (UICC) may include a universal subscriber identity module (USIM); a code division multiple access (CDMA) subscriber identity module (CSIM); a memory to store instructions; and a processor. The processor may execute instructions to determine a type of wireless access network available to a user equipment (UE) associated with the UICC; perform activation of the UICC using the USIM, in response to detecting a CDMA enhanced High Rate Packet Data (eHRPD) network, a Global System for Mobile Communication (GSM) access network, or a Long Term Evolution (LTE) access network; and perform activation of the UICC using the CSIM, in response to detecting an available CDMA access network other than a CDMA eHRPD access network.

20 Claims, 20 Drawing Sheets

US 8,780,797 B2

UNIVERSAL INTEGRATED CIRCUIT CARD ACTIVATION IN A HYBRID NETWORK

BACKGROUND INFORMATION

Mobile wireless communication devices continue to increase in popularity, leading to increasing numbers of users and to demands for more services and higher data rates. In order to satisfy the needs of users and to improve service, providers of mobile wireless communication services continue to improve wireless access networks, as well as core networks, used to deliver services for users of mobile communication devices. One aspect of such improvements may include the development of access networks based on newer standards, protocols, and/or technologies.

While a service provider may update an access network in a particular geographic area to a new generation access network, by, for example, installing a new base station, other geographic areas may continue to be served by an older generation network. A new generation access network may operate under different protocols, use different standards, or include different network nodes than an older generation network.

A mobile communication device, referred to herein as user equipment (UE), may include a subscriber identity module (SIM), which may be used by an access network, and/or a core network, to identify a user of the UE. In a hybrid network, which includes an older generation access network and a new generation access network, management of a SIM may prove to be particularly troublesome.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to a universal integrated circuit (IC) card (UICC) activation. A UICC may include one or more SIMs. A SIM identifies a subscriber in a particular access network. A subscriber may switch UEs by removing the SIM from a first UE and placing the SIM in a second UE. A UICC may include a code division multiple access (CDMA) SIM (CSIM), an Internet Protocol (IP) Multimedia Subsystem (IMS) SIM (ISIM), and a universal SIM (USIM). A CSIM may be used for authentication in CDMA mode, under CDMA 1×RTT coverage and under CDMA high rate packet data (HRPD) coverage. An ISIM may be used in connection with an IMS network, and may not be utilized during UICC activation. A USIM may be used in CDMA mode under enhanced HRPD (eHRPD) coverage, in Global System for Mobile Communication (GSM) mode, and in Long Term Evolution (LTE) mode. Thus, UICC activation may be performed in either CDMA or GSM/LTE mode.

Under CDMA 1×RTT coverage, over the air special provisioning (OTASP) may be performed, using an over the air function (OTAF) number stored in the CSIM, to perform authentication and establish 1×RTT IP connectivity. Under HRPD coverage, a special network access identifier (NAI), stored in the CSIM, may be used to bypass both access network authentication and packet data network (PDN) gateway authentication and establish IP connectivity. Under eHRPD coverage, the special NAI may be used to bypass access network authentication and an NAI, derived from an International Mobile Subscriber Identity (IMSI), may be used for PDN gateway authentication.

Figure 1:
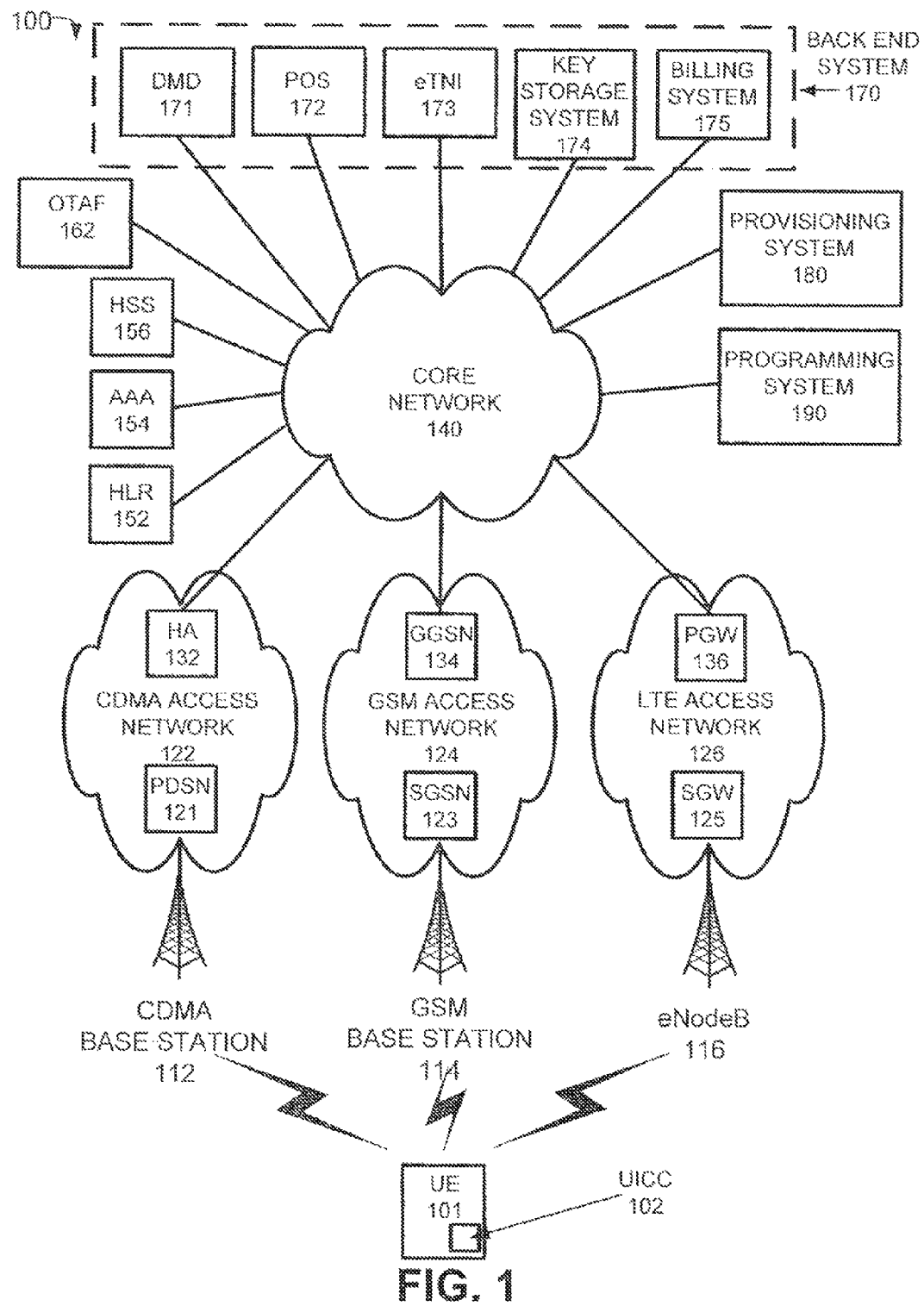
FIG. 1 is a diagram illustrating example components of a system according to an implementation described herein.

FIG. 1 is a diagram illustrating example components of a system 100 according to an implementation described herein. As shown in FIG. 1, system 100 may include a UE 101, a CDMA access network 122, a Global System for Mobile Communications (GSM) access network 124, a Long Term Evolution (LTE) access network 126, a core network 140, a home location register (HLR) 152, an authentication, authorization, and accounting (AAA) server 154, a home subscriber server (HSS) 156, an over the air function (OTAF) 162, back end system 170, a provisioning system 180, and a programming system 190.

UE 101 may include any wireless communication device that a user may use to connect to a CDMA base station 112, GSM base station 114, and/or eNodeB 116. Thus, UE 101 may include a dual mode UE capable of operating in both CDMA mode and in GSM and/or LTE mode. UE 101 may include, for example, a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof UE 101 may include a universal integrated circuit card (UICC) 102. UICC 102 may include information that identifies a particular subscription to system 100 (e.g., a particular customer). UICC 102 may include a CSIM, a USIM, and an ISIM and may need to be activated to allow UE 101 to operate in system 100. UICC 102 may be removed from UE 101 and may be and installed in a new UE.

CDMA access network 122 may include an access network based on, for example, a CDMA2000 standard. For example, CDMA access network may include a CDMA one times radio transmission technology (1×RTT) network, a CDMA HRPD network (which may include a CDMA evolution optimized data only (EV-DO) network), or a CDMA eHRPD network (which may provide access to LTE access network 126).

CDMA access network 122 may include a CDMA base station 112, a packet data service node (PDSN) 121, and a home agent (HA) 132. CDMA base station 112 may include a wireless transceiver and may include functionality necessary to establish a wireless connection between UE 101 and CDMA access network 122. For example, CDMA base station 112 may include a CDMA 1×RTT base station, a CDMA HRPD base station, and/or a CDMA eHRPD base station.

PDSN 121 may provide an access point to and from UE 101 may handle forwarding of data packets for UE 101, and may act as a local anchor point during handover procedures. HA 132 may function as a gateway to an IP network (e.g., core network 140). HA 132 may assign an IP address to UE 101.

GSM access network 124 may include an access network based on a GSM standard. For example, GSM access network 124 may include a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network. GSM access network 122 may include GSM base station 114, a Serving General Packet Radio Service (GPRS) Support Node (SGSN) 123, and a Gateway GPRS Support Node (GGSN) 134.

GSM base station 114 may include a wireless transceiver and may include functionality necessary to establish a wireless connection between UE 101 and GSM access network 124. SGSN 123 may provide an access point to and from UE 101 may handle forwarding of data packets for UE 101 and act as a local anchor point during handover procedures. GGSN 134 may function as a gateway to an IP network (e.g., core network 136). GGSN 134 may assign an IP address to UE 101.

LTE access network 126 may include an access network (e.g., an evolved packet core (EPC) network) based on the LTE standard specified by the 3$^{rd}$ Generation Partnership Project (3GPP). LTE access network 126 may include one or more devices that implement logical entities interconnected via standardized interfaces and that provide packet-switched services between UE 101 and core network 140. LTE access network 126 may include an eNodeB 116, a serving gateway (SGW) 125, and a packet data network gateway (PGW) 136.

eNodeB 116 may include a wireless transceiver and may include functionality necessary to establish a wireless connection between UE 101 and LTE access network 126. SGW 125, may provide an access point to and from UE 101 and may handle forwarding of data packets for UE 101, and may act as a local anchor point during hand-over procedures between different eNodeBs. PGW 136 may function as a gateway to an IP network (e.g., core network 140). UE 101, while connected to a single SGW 125, may be connected to multiple PGWs 136 (e.g., one for each IP network with which UE device 101 communicates). PGW 136 may assign an IP address to UE 101.

Core network 140 may allow the delivery of Internet Protocol (IP) broadband services to UE 101, and may interface with other external networks. Core network 140 may include one or more server devices and/or network devices, or other types of computation or communication devices. Core network 140 may include a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

In one example implementation, core network 140 may include an IMS network (not shown in FIG. 1). An IMS network may include a network for delivering IP multimedia services as specified by 3GPP and may provide media flows between UE device 101 and external IP networks or external circuit-switched networks (not shown in FIG. 1). Core network 140 may allow CDMA access network 122, GSM access network 124, and LTE access network 126 to communicate with HLR 152, AAA server 154, HSS 156, OTAF 162, back end system 170, provisioning system 180, programming system 190, and SMS center 195.

HLR 152 may include one or more devices that store information about subscribers of CDMA access network 122 and/or GSM access network 124. For example, HLR 152 may store information associated with a UICC associated with a subscriber, services that the subscriber has requested or been assigned and settings associated with the services, and/or a current location of the subscriber.

AAA server 154 may include one or more devices that perform authentication, authorization, and/or accounting in system 100. For example, AAA server 154 may verify a subscriber's identity, authorize access to a particular access network or access to core network 140, authorize a particular service, and/or track consumption of network resources for a particular subscriber.

HSS 156 may include one or more devices that store information about subscribers of LTE access network 126. For example, HSS 156 may store information associated with a UICC associated with a subscriber, services that the subscriber has requested or been assigned and settings associated with the services, and/or a current location of the subscriber.

OTAF 162 may include one or more devices that perform service provisioning in a CDMA 1×RTT network. For example, OTAF 162 may receive a request for service provisioning from UE 101 to access a CDMA 1×RTT access network and may grant access to the CDMA 1×RTT access network to UE 101.

Back end system 170 may include one or more devices involved in processing of UICC 102 when a customer purchases a new subscription. Back end system 170 may include a device management database (DMD) 171, a point of sale system (POS) 172, an electronic telephone number directory (eTNI) 173, a key storage system 174, and a billing system 175.

DMD 171 may store information about UE 101 and associate UE 101 with UICC 102. For example, when UICC 102 is installed in a new UE, DMD 171 may receive information about the new UE from provisioning system 180 and store the received information. DMD 171 may store information about capabilities of UE 101 and provide the information about the capabilities of UE 101 to POS 172.

POS 172 may include one or more devices that communicate with system 100 when a customer purchases UE 101 or requests a new subscription for services associated with system 100. For example, POS 172 may include a terminal associated with a sales clerk in a retail store.

eTNI 173 may store information about available telephone and/or identification numbers. For example, eTNI 173 may receive a request from POS 172 for available telephone and/or identification numbers during the creation of a new subscription and may provide to POS 172 an available Mobile Subscriber Integrated Services Digital Network number (MSISDN), an available International Mobile Subscriber Identity (IMSI) number, and/or an available mobile identification number (MIN).

Key storage system 174 may include one or more devices that store keys used for provisioning services for a new subscription. For example, key storage system 174 may store keys used by provisioning system 180 to authenticate communication with HLR 152, AAA 154, HSS 156, and/or programming system 190.

Billing system 175 may include one or more devices that perform billing functions in system 100. For example, billing system 175 may receive a request from POS 172 to set up a new subscription, determine particular services requested by the customer, send a request to provisioning system 180 to set up the requested services, and/or set up billing for the requested services.

Provisioning system 180 may include one or more devices that perform provisioning services in system 100. For example, provisioning system 180 may request HLR 152, AAA 154, and HSS 156 to create accounts associated with UICC 102 and to store information associated with UICC 102. Furthermore, provisioning system 180 may provide information about UICC 102 to programming system 190 to allow programming system 190 to activate UICC 102.

Programming system 190 may include one or more devices that perform activation of UICC 102. For example, programming system 190 may receive an activation request from UICC 102 and may provide updated files for a USIM, ISIM, and CSIM included in UICC 102, as well as application configuration updates for UICC 102.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2:
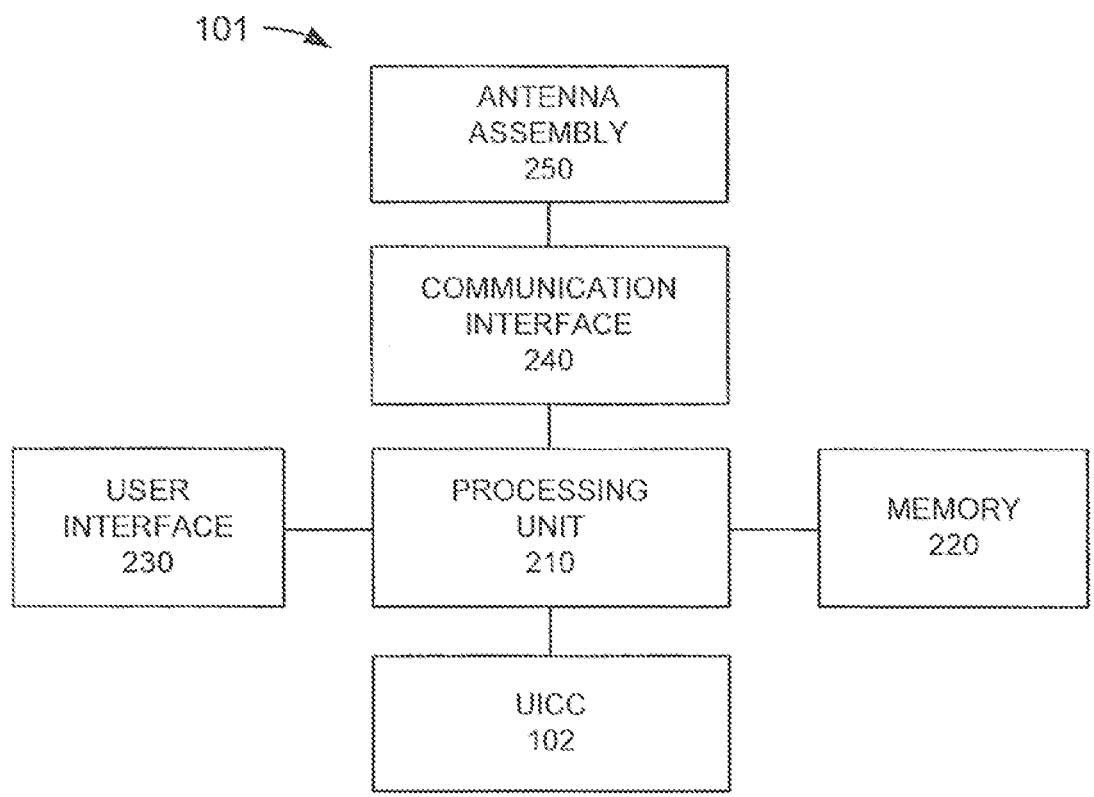
FIG. 2 is a diagram illustrating example components of a UE according to an implementation described herein.

FIG. 2 is a diagram illustrating example components of UE 101 according to an implementation described herein. As shown in FIG. 2, UE 101 may include a processing unit 210, a memory 220, a user interface 230, a communication interface 240, an antenna assembly 250, and UICC 102.

Processing unit 210 may include one or more processors, microprocessors, application specific integrated circuits (ASICs), field programmable gate arrays (FPGAs), or the like. Processing unit 210 may control operation of UE 101 and its components.

Memory 220 may include a random access memory (RAM), a read only memory (ROM), and/or another type of memory to store data and instructions that may be used by processing unit 210.

User interface 230 may include mechanisms for inputting information to UE 101 and/or for outputting information from UE 101. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, or keys of a keypad) to permit data and control commands to be input into UE 101; a display to output visual information; and/or a vibrator to cause UE 101 to vibrate.

Communication interface 240 may include any transceiver-like mechanism that enables UE 101 to communicate with other devices and/or systems. For example, communication interface 240 may include a modem or an Ethernet interface to a local area network (LAN). Communication interface 240 may also include mechanisms for communicating via a network, such as a wireless network. For example, communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air and receive RF signals over the air and provide them to communication interface 240. In one implementation, for example, communication interface 240 may communicate with CDMA access network 122, GSM access network 124, LTE access network 126, or with another access network.

As described herein, UE 101 may perform certain operations in response to processing unit 210 executing software instructions contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Processing unit 210 may communicate with UICC 102. For example, processing unit 210 may receive instructions from UICC 102 and may perform the received instructions. For example, UICC 102 may instruct processing unit 210 to provide particular information to a particular component of system 100 via communication interface 240 and/or to request particular information from a particular component of system 100. As another example, processing unit 210 may receive, via communication interface 240, particular information for UICC 102 from a particular component of system 100 and/or may receive a request for particular information from UICC 102 from a particular component of system 100. As yet another example, when UE 101 powers up, UICC 102 may take control and may instruct processing unit 210 to perform one or more operations.

Although FIG. 2 shows example components of UE 101, in other implementations, UE 101 may include fewer components, different components, differently arranged components, or additional components than depicted in FIG. 2. Additionally or alternatively, one or more components of UE 101 may perform the tasks described as being performed by one or more other components of UE 101.

Figure 3A:
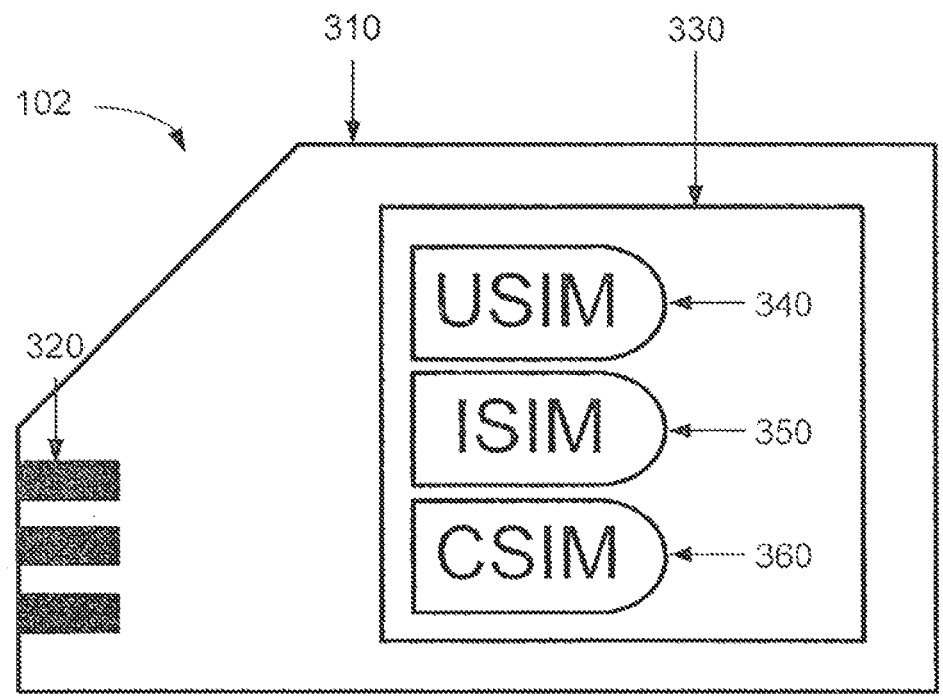
FIG. 3A is a diagram illustrating example components of the universal integrated circuit card (UICC) depicted in FIG. 2.

FIG. 3A is a diagram illustrating example components of UICC 102. As shown in FIG. 3A, UICC 102 may include a housing 310, contacts 320, and an integrated circuit (IC) area 330. Housing 310 may protect IC area 330 from outside elements. Housing 310 may include a structure configured to hold contacts 320 and IC area 330, and may be formed from a variety of materials. For example, housing 330 may be formed from plastic, metal, or a composite. Contacts 320 may include one or more contacts to electronically connect UICC 102 to UE 101. Contacts 320 may include a power contact to supply electrical power from UE 101 to UICC 102.

IC area 330 may include a Universal SIM (USIM) 340, an IMS SIM (ISIM) 350, and a CDMA SIM (CSIM) 360. USIM 340 may store subscriber information and authentication information for accessing GSM access network 124 and for accessing LTE access network 126. USIM 340 may also include storage space for SMS messages and contacts. ISIM 350 may store a subscriber's IMS identity, such as a public IMS identity and a private IMS identity. CSIM 360 may store subscriber information and authentication information for accessing CDMA access network 122.

Although FIG. 3A shows example components of UICC 102, in other implementations, UICC 102 may include fewer components, different components, differently arranged components, or additional components than depicted in FIG. 3A. Additionally or alternatively, one or more components of UICC 102 may perform the tasks described as being performed by one or more other components of UICC 102.

Figure 3B:
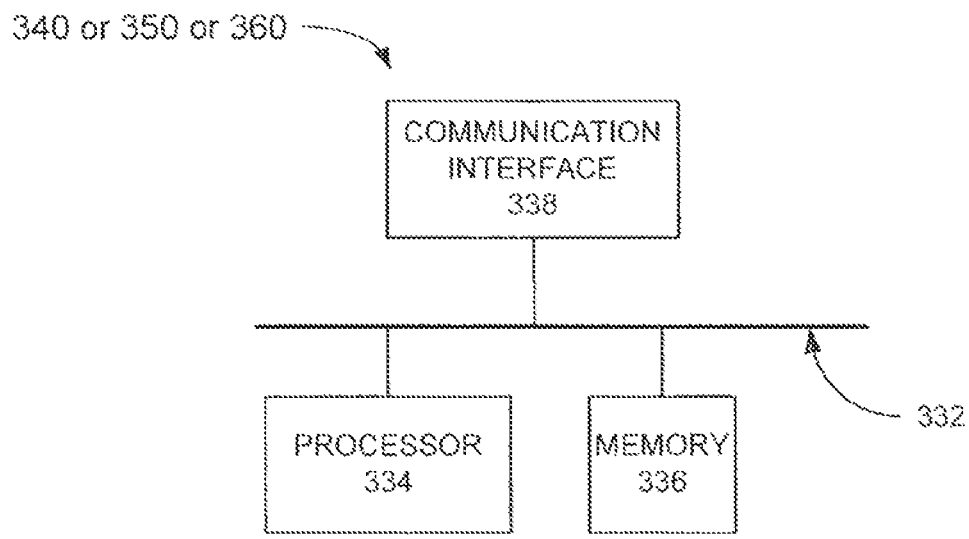
FIG. 3B is a diagram illustrating example components of the Universal SIM (USIM), Internet Protocol Multimedia Subsystem SIM (ISIM), or Code Division Multiple Access SIM (CDMA) depicted in FIG. 3A.

FIG. 3B is a diagram illustrating example components of USIM 340, ISIM 350, or CSIM 360. As shown in FIG. 3B, USIM 340, ISIM 350, or CSIM 360 may include a bus 332, a processor 334, a memory 336, and a communication interface 338.

Bus 332 may include a path that permits communication among the components of USIM 340, ISIM 350, or CSIM 360. Processor 334 may include one or more processors, microprocessors, or processing logic (e.g., ASICs or FPGAs) that may interpret and execute instructions. Memory 336 may include a RAM device or another type of dynamic storage device that may store information and instructions for execution by processor 334 or a ROM device or another type of static storage device that may store static information and instructions for use by processor 334. Communication interface 338 may include any interface mechanism that enables USIM 340, ISIM 350, or CSIM 360 to communicate with UE 101.

As will be described in detail below, USIM 340, ISIM 350, or CSIM 360 may perform certain operations. USIM 340, ISIM 350, or CSIM 360 may perform these operations in response to processor 334 executing software instructions contained in a computer-readable medium, such as memory 336.

The software instructions may be read into memory 336 from another computer-readable medium, or from another device via communication interface 338. The software instructions contained in memory 336 may cause processor 334 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3B shows example components of USIM 340, ISIM 350, or CSIM 360, in other implementations, USIM 340, ISIM 350, or CSIM 360 may include fewer components, different components, differently arranged components, or additional components than depicted in FIG. 3B. Additionally or alternatively, one or more components of USIM 340, ISIM 350, or CSIM 360 may perform the tasks described as being performed by one or more other components of USIM 340, ISIM 350, or CSIM 360.

Figure 4:
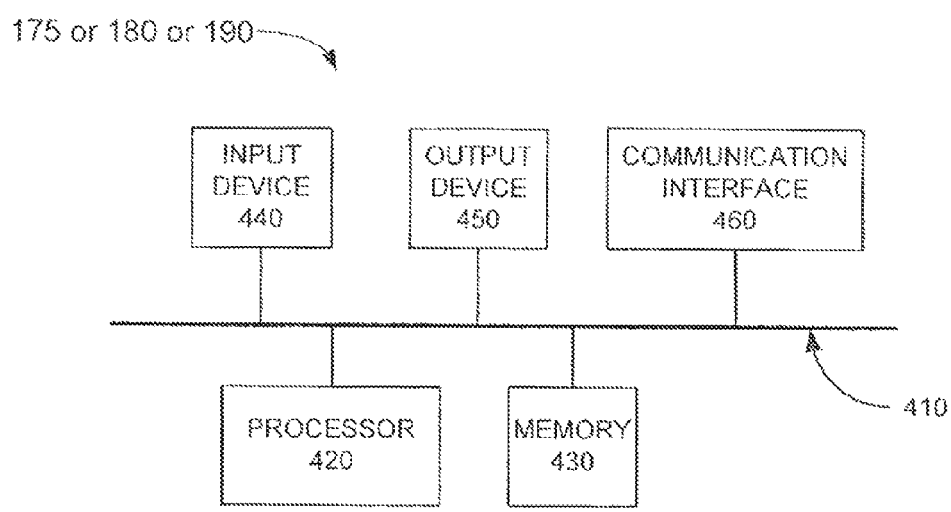
FIG. 4 is a diagram illustrating example components of the billing system, provisioning system, or programming system of FIG. 1.

FIG. 4 is a diagram illustrating example components of billing system 175, provisioning system 180, or programming system 190. As shown in FIG. 4, billing system 175, provisioning system 180, or programming system 190 may include a bus 410, a processor 420, a memory 430, an input device 440, an output device 450, and a communication interface 460.

Bus 410 may include a path that permits communication among the components of billing system 175, provisioning system 180, or programming system 190. Processor 420 may include one or more processors, microprocessors, or processing logic (e.g., ASICs or FPGAs) that may interpret and execute instructions. Memory 430 may include a RAM device or another type of dynamic storage device that may store information and instructions for execution by processor 420, a ROM device or another type of static storage device that may store static information and instructions for use by processor 420, a magnetic and/or optical recording memory device and its corresponding drive, and/or a removable form of memory, such as a flash memory.

Input device 440 may include a mechanism that permits an operator to input information to billing system 175, provisioning system 180, or programming system 190, such as a keypad, a button, a pen, a touch screen, voice recognition and/or biometric mechanisms, etc. Output device 450 may include a mechanism that outputs information to the operator, such as a display, a speaker, etc. Communication interface 460 may include any transceiver-like mechanism that enables billing system 175, provisioning system 180, or programming system 190 to communicate with other devices and/or systems. For example, communication interface 460 may include a modem, a network interface card, or a wireless interface card.

As will be described in detail below, billing system 175, provisioning system 180, or programming system 190 may perform certain operations. Billing system 175, provisioning system 180, or programming system 190 may perform these operations in response to processor 420 executing software instructions contained in a computer-readable medium, such as memory 430.

The software instructions may be read into memory 430 from another computer-readable medium, or from another device via communication interface 460. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of billing system 175, provisioning system 180, or programming system 190, in other implementations, billing system 175, provisioning system 180, or programming system 190 may include fewer components, different components, additional components, or differently arranged components than depicted in FIG. 4. Additionally or alternatively, one or more components of billing system 175, provisioning system 180, or programming system 190 may perform one or more tasks described as being performed by one or more other components of billing system 175, provisioning system 180, or programming system 190.

Figure 5A:
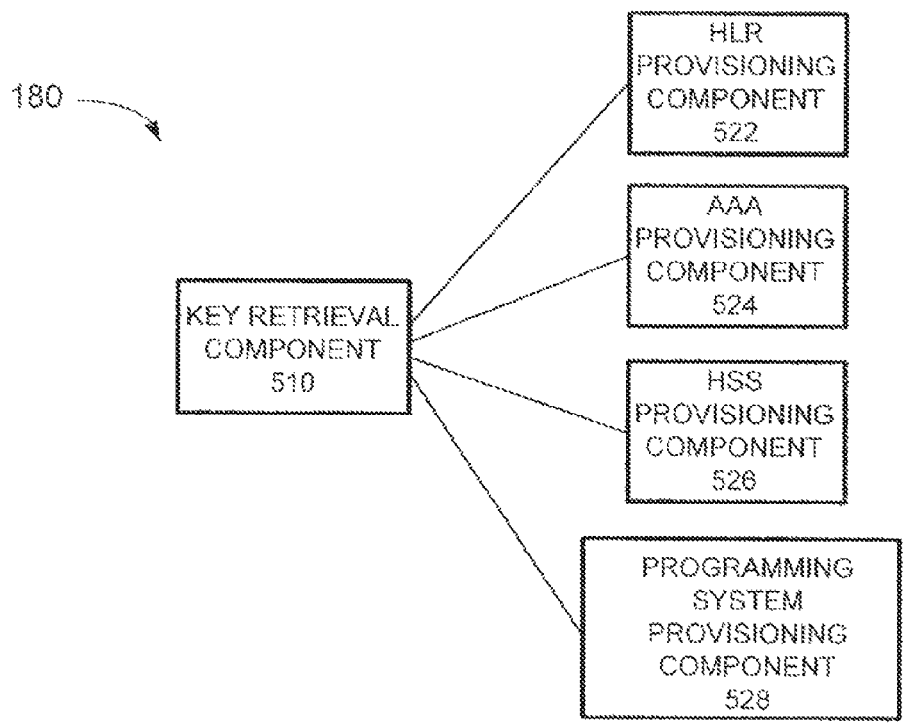
FIG. 5A is a diagram illustrating example functional components of the provisioning system of FIG. 1.

FIG. 5A is a diagram illustrating example functional components of provisioning system 180. As shown in FIG. 5A, provisioning system 180 may include a key retrieval component 510, an HLR provisioning component 522, an AAA provisioning component 524, an HSS provisioning component 526, and a programming system provisioning component 528.

Key retrieval component 510 may contact key storage system 174 to retrieve keys associated with HRL provisioning, AAA provisioning, HSS provisioning, and/or programming system 190 provisioning. HLR provisioning component 522 may perform HLR provisioning. For example, HLR provisioning component 522 may contact HLR 152 and request that a new account be created for a user associated with UICC 102. HLR provisioning component may provide, to HLR 152, particular keys received from key retrieval component 510 when requesting the creation of the account.

AAA provisioning component 524 may perform AAA provisioning. For example, AAA provisioning component 524 may contact AAA 154 and request that a new account be created for a user associated with UICC 102. AAA provisioning component 524 may provide, to AAA 154, particular keys received from key retrieval component 510 when requesting the creation of the account.

HSS provisioning component 526 may perform HSS provisioning. For example, HSS provisioning component 526 may contact HSS 156 and request that a new account be created for a user associated with UICC 102. HSS provisioning component 526 may provide, to HSS 156, particular keys received from key retrieval component 510 when requesting the creation of the account.

Programming system provisioning component 528 may perform provisioning associated with programming system 190. For example, programming system provisioning component 528 may contact programming component 190 and request that a new account be created for a user associated with UICC 102. Programming system provisioning component 528 may provide, to programming system 190, particular keys received from key retrieval component 510 when requesting the account. Additionally, programming system provisioning component 528 may provide USIM, ISIM, CSIM, and application configuration files to programming system 190 that are to be sent to UICC 102 during activation of UICC 102.

Although FIG. 5A shows example functional components of provisioning system 180, in other implementations, provisioning system 180 may include fewer functional components, different functional components, differently arranged functional components, or additional functional components than depicted in FIG. 5A. Additionally or alternatively, one or more functional components of provisioning system 180 may perform one or more other tasks described as being performed by one or more other functional components of provisioning system 180.

Figure 5B:
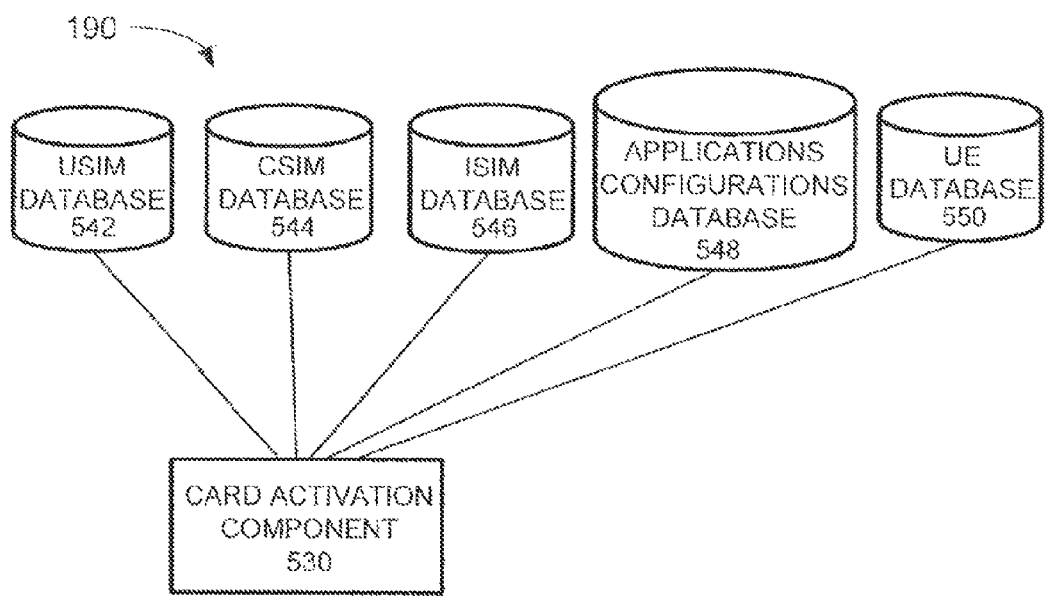
FIG. 5B is a diagram illustrating example functional components of the programming system of FIG. 1.

FIG. 5B is a diagram illustrating example functional components of programming system 190. As shown in FIG. 5B, programming system 190 may include a card activation component 530, a USIM database 542, a CSIM database 544, a ISIM database 546, an application configuration database 548, and a UE database 550.

Card activation component 530 may perform activation of UICC 102. For example, during UICC activation, card activation component 530 may provide, to UICC 102, information stored in USIM database 542, CSIM database 544, ISIM database 546, and/or application configuration database 548. Card activation component 530 may receive information from UICC 102 about UE 101 and store the received information in UE database 550.

USIM database 542 may store files that are to be provided to USIM 340 during activation of UICC 102. ISIM database 544 may store files that are to be provided to ISIM 350 during activation of UICC 102. CSIM database 546 may store files that are to be provided to CSIM 360 during activation of UICC 102. Application configuration database 548 may store application configuration files that are to be provided to UICC 102 during activation of UICC 102. UE database 550 may store information about UE 101 that may be received from UICC 102 during activation or after UICC is placed into a new UE.

Although FIG. 5B shows example functional components of programming system 190, in other implementations, programming system 190 may include fewer functional components, different functional components, differently arranged functional components, or additional functional components than depicted in FIG. 5B. Additionally or alternatively, one or more functional components of programming system 190 may perform one or more other tasks described as being performed by one or more other functional components of programming system 190.

Figure 5C:
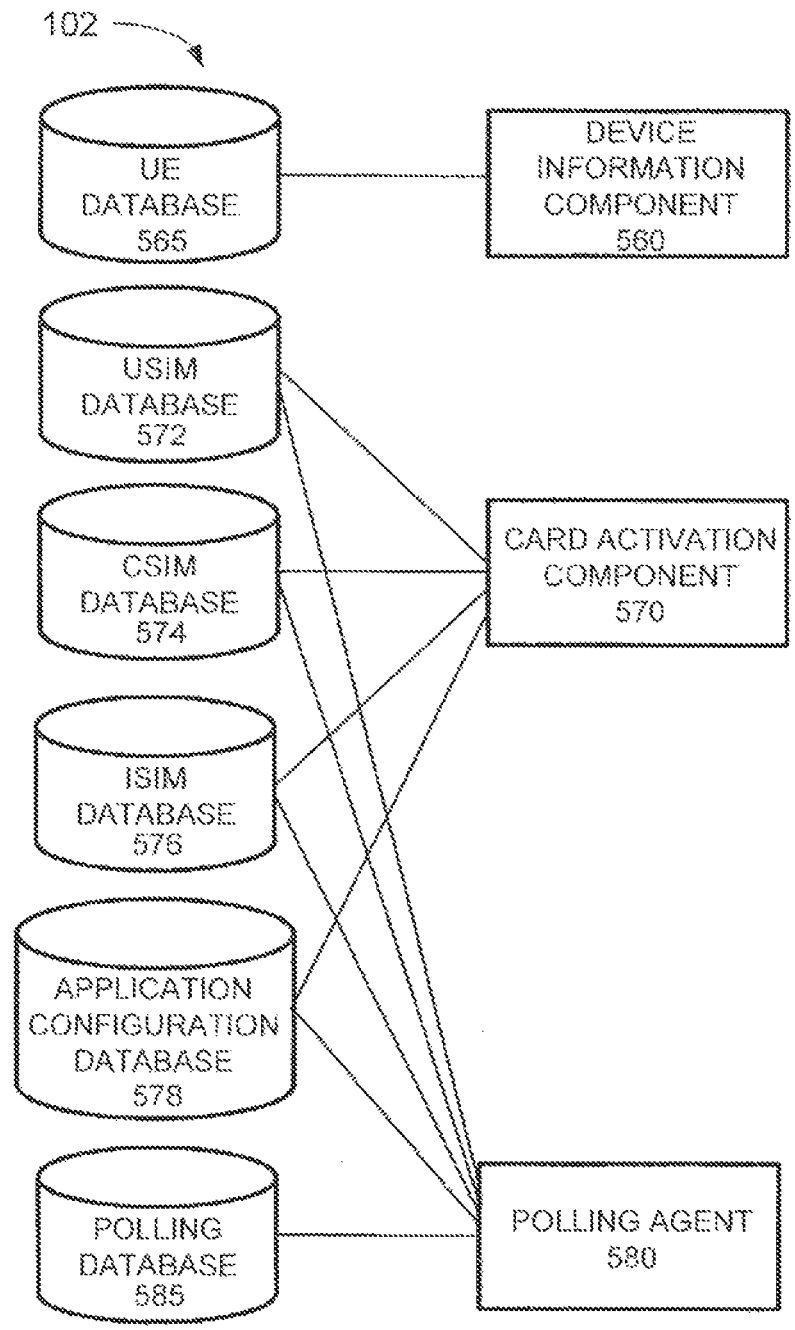
FIG. 5C is a diagram illustrating example functional components of the UICC depicted in FIG. 3A.

FIG. 5C is a diagram illustrating example functional components of UICC 102. As shown in FIG. 5C, UICC 102 may include a device information component 560, a UE database 565, a card activation component 570, a USIM database 572, a CSIM database 574, an ISIM database 576, an application configuration database 578, a polling agent 580, and a polling database 585.

Device information component 560 may determine information associated with UE 101 and store the information in UE database 565. UE database 565 may store information associated with UE 101. Example fields that may be stored in UE database 565 are described below with reference to FIG. 6. Card activation component 570 may send a request to programming system 190 to request activation of UICC 102, may receive file updates from programming system 190, and may store the file updates in USIM database 572, CSIM database 574, ISIM database 576, and application configuration database 578.

USIM database 572 may store information used by UICC 102 during communication with GSM access network 124 or LTE access network 126. CSIM database 574 may store information used by UICC 102 during communication with CDMA access network 122. ISIM database 576 may store information used by UICC 102 during communication with an IMS network. Application configuration database 578 may store information about associated with particular applications and/or settings associated with UE 101. Example fields that may be stored in USIM database 572, CSIM database 574, ISIM database 576, and application configuration database 578 are described below with reference to FIG. 6.

Polling agent 580 may detect, based on accessing polling database 585, a trigger event for requesting that UICC 102 be updated and may send a polling request for updates to programming system 190. Polling agent 580 may receive file updates from programming system 190 and may update USIM database 572, CSIM database 574, ISIM database 576, and application configuration database 578 based on the received file updates. Polling database 585 may store information about trigger events for requesting updates. For example, polling database 585 may store particular dates and times when polling agent 580 is to request an update.

Although FIG. 5C shows example functional components of UICC 102, in other implementations, UICC 102 may include fewer functional components, different functional components, differently arranged functional components, or additional functional components than depicted in FIG. 5C. Additionally or alternatively, one or more functional components of UICC 102 may perform one or more other tasks described as being performed by one or more other functional components of UICC 102.

Figure 6:
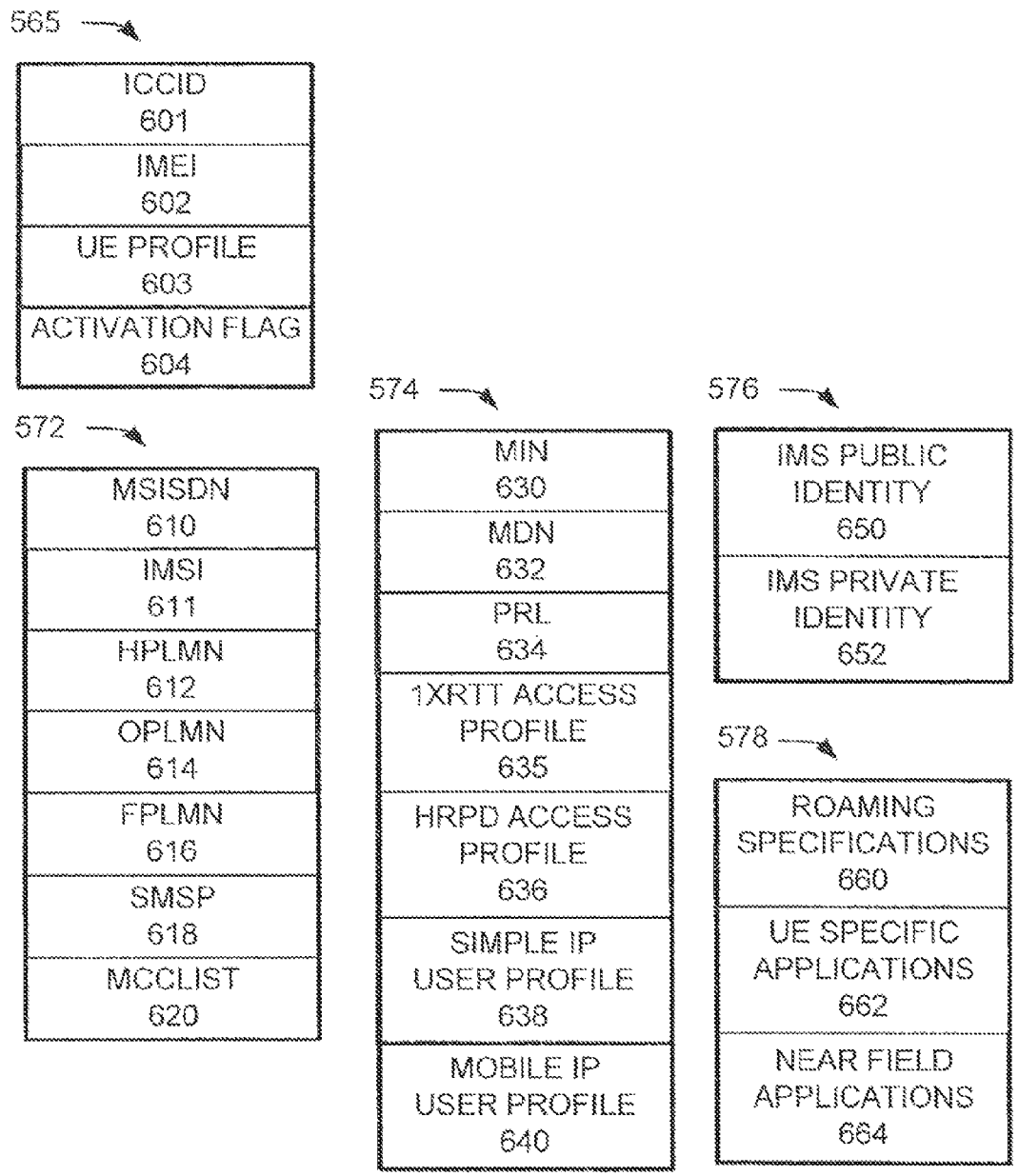
FIG. 6 is a diagram of example fields that may be stored within the databases depicted in FIG. 5C according to an implementation described herein.

FIG. 6 is a diagram of example fields that may be included within the databases depicted in FIG. 5C. As shown in FIG. 6, UE database 565 may include an Integrated Circuit Card Identification (ICCID) field 601, an International Mobile Equipment Identification (IMEI) field 602, a UE profile 603, and an activation flag field 604.

ICCID field 601 may store an ICCID associated with UICC 102. The ICCID may include a string that uniquely identifies UICC 102 to system 100. IMEI field 602 may include an IMEI associated with UE 101. The IMEI may uniquely identify UE 101 to system 100. Additionally or alternatively, IMEI field 602 may store an IMEI and a software version associated with UE 101 (IMEI_SV). UE profile 603 may store information associated with UE 101, such as capabilities of UE 101 and/or metrics associated with UE 101 that may be used by system 100 to optimize the performance of UE 101. Activation flag field 604 may store information about whether UICC 102 has been activation. For example, after UICC 102 has been activation, an activation flag stored in activation flag field 604 may be set.

As shown in FIG. 6, USIM database 572 may include an MSISDN field 610, an IMSI field 611, a home public land mobile network (HPLMN) field 612, an operation PLMN (OPLMN) field 614, a forbidden PLMN (FPLMN) field 616, an SMS platform (SMSP) field 618, and a mobile country code list (MCCLIST) field 620.

MSISDN field 610 may store an MSISDN associated with the user of UICC 102. The MSISDN may uniquely identify a subscription to system 100. IMSI field 611 may store an IMSI number associated with UICC 102. The IMSI number may uniquely identify a user to system 100. The IMSI number may include an MCC that identifies a country associated with the user and a Mobile Network Code (MNC) associated with the user.

HPLMN field 612 may store a HPLMN (e.g., service provider) associated with the user of UICC 102. OPLMN field 614 may store an OPLMN (e.g., a PLMN associated with administrative and monitoring functions) associated with the user of UICC 102. FPLMN field 616 may store a FPLMN (e.g., a PLMN accessible only during emergencies) associated with the user of UICC 102. SMSP field 618 may identify SMS center 195. MCCLIST field 620 may identify a list of countries in which UICC 102 may operate.

As shown in FIG. 6, CSIM database 574 may include a MIN field 630, a mobile directory number (MDN) field 632, a preferred roaming list (PRL) field 634, a 1×RTT access profile field 635, an HRPD access profile field 636, a simple IP user profile 638, and a mobile IP user profile 640.

MIN field 630 may store an MIN associated with UE 101 and may be derived from the MDN assigned to UE 101. MDN field 632 may store an MDN associated with a subscription in system 100, associated with UE 101, and may correspond to the actual 10 digit number dialed to reach UE 101. PRL field 634 may store a PRL associated with UE 101. The PRL may specify which bands, sub-bands, and/or service provider identifiers will be scanned and in what priority order. 1×RTT access profile field 635 may store information used to access a CDMA 1×RTT network. For example, 1×RTT access profile field 635 may store an OTASP number used to reach OTAF 162. HRPD access profile field 636 may store information used to access a CDMA HRPD network. For example, HRPD access profile field 636 may store a special NAI used to bypass authentication in an HRPD network during UICC activation. Simple IP user profile 638 and mobile IP user profile 640 may store settings for CDMA simpleIP and mobileIP protocols, which may allow UE 101 to maintain IP connectivity while roaming.

ISIM database 576 may include an IMS public identity field 650, and an IMS private identity field 652. IMS public identity field 650 may include a user's public IMS identity. The public IMS identity may be used to communicate with other users in an IMS network. IMS private identity field 652 may store a user's private IMS identity. The private IMS identity may be assigned by a home network operator and may be used registration and AAA functions in an IMS network.

Application configuration database 578 may include a roaming specifications field 660, and a UE specific applications field 662. Roaming specifications field 660 may include roaming specifications associated with UICC 102. UE specific applications field 662 may include information associated with particular applications associated with UE 101.

Although FIG. 6 shows example fields of USIM database 572, CSIM database 574, ISIM database 576, and application configuration database 578, in other implementations, USIM database 572, CSIM database 574, ISIM database 576, and application configuration database 578 may contain fewer fields, different fields, additional fields, or differently arranged fields than depicted in FIG. 6. Additionally or alternatively, one or more fields of USIM database 572, CSIM database 574, ISIM database 576, and application configuration database 578 may include information described as being included in one or more other fields of USIM database 572, CSIM database 574, ISIM database 576, and application configuration database 578.

Figure 7:
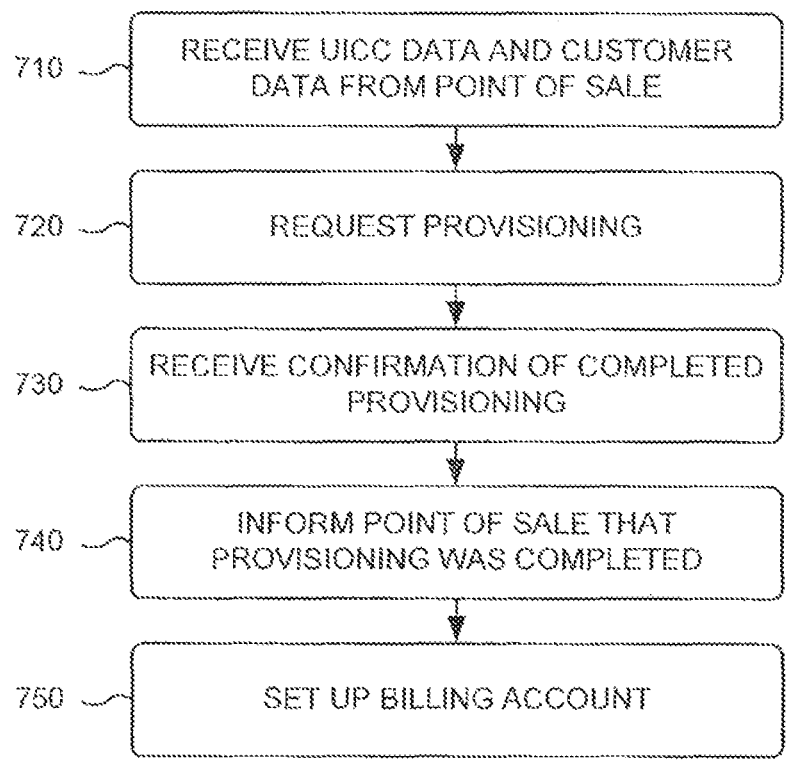
FIG. 7 is a flow diagram illustrating an example process performed by the billing system, in response to a purchase, according to an implementation described herein.

FIG. 7 is a flow diagram illustrating an example process performed in response to a purchase according to an implementation described herein. In one implementation, the process of FIG. 7 may be performed by billing system 175. In other implementations, some or all of the process of FIG. 7 may be performed by another device or a group of devices separate from or including billing system 175.

The process of FIG. 7 may include receiving UICC data and customer data from POS 172 (block 710). For example, a customer may purchase UE 101 at POS 172 and a sales associate may install UICC 102 into UE 101. POS 172 may obtain ICCID associated with UICC 102, and may obtain MSISDN, MIN, and IMSI assigned to the customer from eTNI 173. The customer may then select one or more service plans with particular services, billing rates, and/or quality of service (QoS) requirements. POS 172 may then send UICC data associated with UICC 102, including the ICCID, MSISDN, MIN, MDN, and/or IMSI, as well as customer information, which may include information identifying the customer and/or payment information, as well as the one or more service plans selected by the customer, to billing system 175.

Provisioning may be requested (block 720). For example, billing system 175 may send a request to provisioning system 180 to provision the services requested by the customer for UICC 102 and/or UE 101. The request may include the received UICC data, including the ICCID, MSISDN, MIN, MDN, and/or IMSI, and the customer data.

Confirmation of completed provisioning may be received (block 730). For example, billing system 175 may wait for confirmation from provisioning system 180, indicating that provisioning of the services has been completed.

POS may be informed that provisioning was completed (block 740). Once billing system 175 receives confirmation from provisioning system 180 that provisioning has been completed, billing system 175 may be set up (block 750). For example, billing system 175 may set up a billing account for the customer based on the received customer information and the received payment information.

Figure 8:
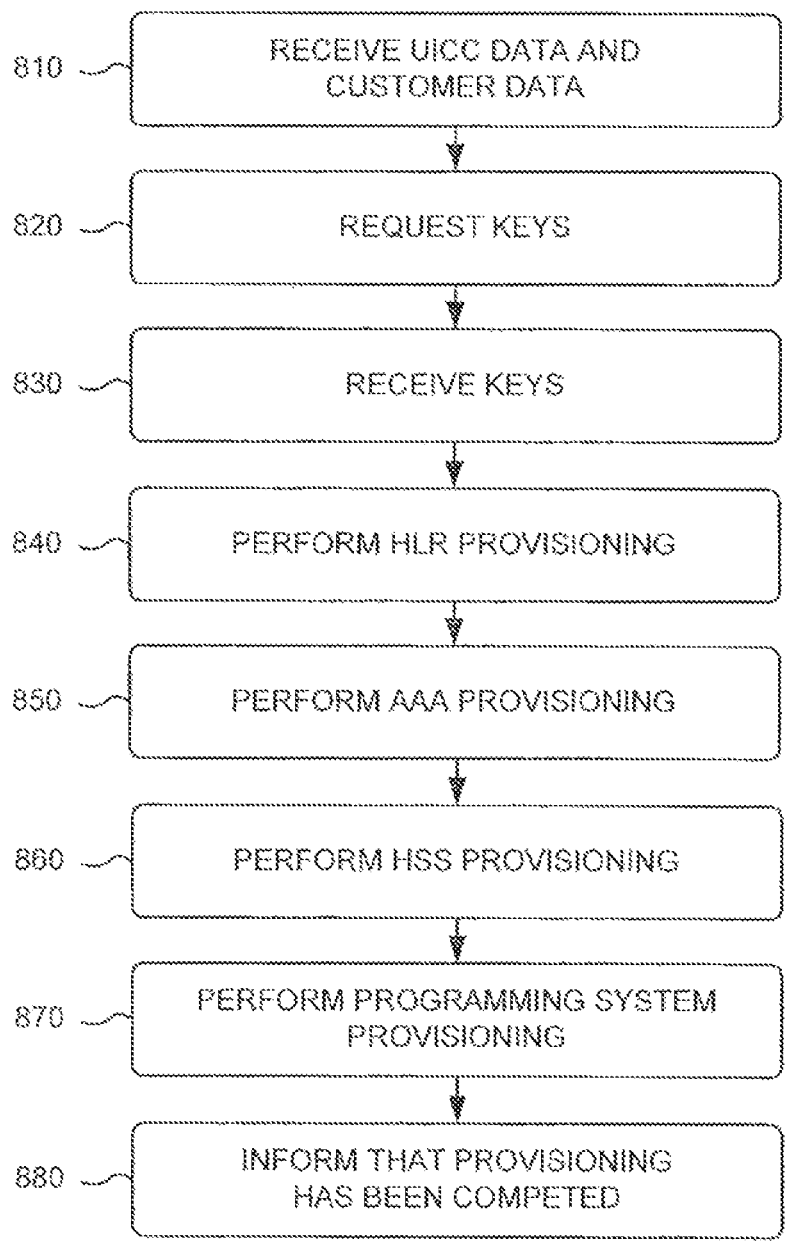
FIG. 8 is a flow diagram illustrating an example process performed by the provisioning system, in response to being contacted by the billing system, according to an implementation described herein.

FIG. 8 is a flow diagram illustrating an example process performed in response to being contacted by billing system 175 according to an implementation described herein. In one implementation, the process of FIG. 8 may be performed by provisioning system 180. In other implementations, some or all of the process of FIG. 8 may be performed by another device or a group of devices separate from or including provisioning system 180.

The process of FIG. 8 may include receiving UICC data and customer data (block 810). For example, provisioning system 180 may receive UICC data associated with UICC 102, including the ICCID, MSISDN, MIN, MDN, and/or IMSI, as well as customer information, such as the one or more service plans selected by the customer, from billing system 175. Keys may be requested (block 820). For example, provisioning system 180 may request authentication keys from key storage system 174 by providing the ICCID associated with UICC 102 to key storage system 174.

Keys may be received (block 830). For example, key storage system 174 may retrieve keys associated with ICCID and provide the keys to provisioning system 180. The keys may include an Extended Unique Material Identifier (EUMID), an authentication key (A-Key), an Authentication and Key Agreement key (AKA-Key), one or more OTA keys, and/or one or more other types of keys.

HLR provisioning may be performed (block 840). For example, provisioning system 180 may send a request to HLR 152 to create an account associated with the received MIN and/or MDN. The request may include the MDN, the MIN, as well as the EUMID and the A-Key received from key storage system 174. Provisioning system 180 may wait for confirmation from HRL 152 to determine that HLR provisioning has been successfully accomplished.

AAA provisioning may be performed (block 850). For example, provisioning system 180 may send a request to AAA server 154 to create an account associated with the received MSISDN and/or IMSI. The request may include the MSISDN, IMSI, as well as the AKA-Key received from key storage system 174. Provisioning system 180 may wait for confirmation from AAA server 154 to determine that AAA provisioning has been successfully accomplished.

HSS provisioning may be performed (block 860). For example, provisioning system 180 may send a request to HSS 156 to create an account associated with the received MSISDN and/or IMSI. The request may include the MSISDN, IMSI, as well as the AKA-Key received from key storage system 174. Provisioning system 180 may wait for confirmation from HSS server 156 to determine that HSS provisioning has been successfully accomplished.

Programming system provisioning may be performed (block 870). For example, provisioning system 180 may send one or more requests to programming system 190 to create an account associated with the ICCID, associated with UICC 102. The one or more requests may include the ICCID, the MSISDN, the IMSI, the MIN, as well as the OTA keys; USIM, CSIM, and ISIM files to be updated during activation; and application configurations to be updated during activation. Provisioning system 180 may wait for confirmation from programming system 190 to determine that programming system provisioning has been successfully accomplished.

The billing system may be informed that provisioning has been completed (block 880). For example, provisioning system 180 may send a message to billing system 175 that all requested provisioning has been completed.

Figure 9:
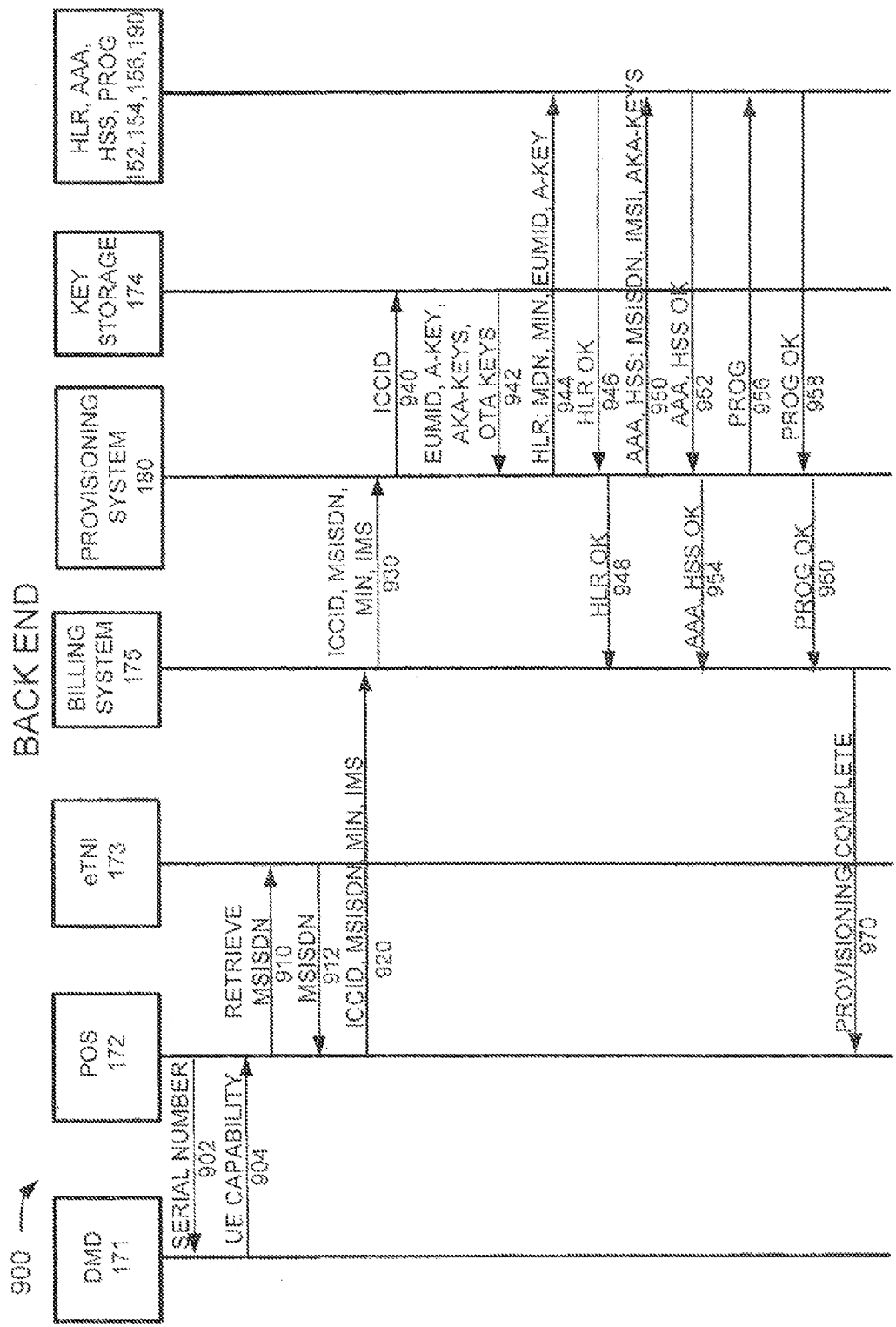
FIG. 9 is a diagram illustrating an example signal flow at the back end of the network, in response to a purchase, according to an implementation described herein.

FIG. 9 is a diagram illustrating an example signal flow 900 performed at back end system 170, in response to a purchase, according to an implementation described herein. Signal flow 900 illustrates the processes of FIG. 7 and FIG. 8 in the context of system 100.

The signal flow of FIG. 9 may include sending a UE serial number from POS 172 to DMD 171 (signal 902). For example, a customer may select UE 101 for purchase and POS 172 may send the serial number, associated with UE 101, to DMD 171. DMD 171 may return information to POS 172 about the capabilities (e.g., functions, supporting software, receiving and/or transmitting functionality, etc.) of UE 101 (signal 904). POS 172 may contact eTNI 173 with a request to retrieve an available MSISDN for UICC 102 that is associated with UE 101 (signal 910). eTNI 173 may select an available MSISDN, as well as an available IMSI and MIN, and provide the selected MSISDN, IMSI, and MIN to POS 173 (signal 912). POS 173 may provide the ICCID, associated with UICC 102, along with the selected MSISDN, IMSI, and MIN to billing system 175 (signal 920).

Billing system 175 may request provisioning for UICC 102 by contacting provisioning system 180 (signal 930). The request may include the ICCID associated with UICC 102, as well as the MSISDN, the MIN, and the IMSI selected for UICC 102. Provisioning system 180 may request keys from keys storage system 174 (signal 940). The request for keys may include the ICCID associated with UICC 102. Key storage system 174 may provide keys to provisioning system 180 (signal 942). The keys may include an Extended Unique Material Identifier (EUMID), an authentication key (A-Key), an Authentication and Key Agreement key (AKA-Key), and/or one or more OTA keys.

Provisioning system 180 may send a request to HLR 152 to create an account associated with the received MIN and/or MDN (signal 944). The request may include the MDN, the MIN, as well as the EUMID and the A-Key received from key storage system 174. Provisioning system 180 may receive confirmation from HRL 152 that HLR provisioning has been successfully completed (signal 946). Provisioning system 180 may send confirmation to billing system 175, indicating that HLR provisioning has been successfully completed (signal 948).

Provisioning system 180 may send a request to AAA 154 and/or HSS 156 to create an account associated with the received MSISDN and/or IMSI (signal 950). The request may include the MSISDN, the IMSI, as well as the AKA-Keys received from key storage system 174. Provisioning system 180 may receive confirmation from AAA 154 and from HSS 156 that AAA and HSS provisioning has been successfully completed (signal 952). Provisioning system 180 may send confirmation to billing system 175, indicating that AAA and HSS provisioning has been successfully completed (signal 954).

Provisioning system 180 may send one or more requests to programming system 190 to create an account associated with the ICCID, associated with UICC 102 (signal 956). The one or more requests may include the ICCID, the MSISDN, the IMSI, the MIN, as well as the OTA keys; USIM, CSIM, and ISIM files to be updated during activation; and/or application configurations to be updated during activation. Provisioning system 180 may receive confirmation from programming system 190 that programming provisioning has been successfully completed (signal 958). Provisioning system 180 may send confirmation to billing system 175, indicating that programming provisioning has been successfully completed (signal 960). Billing system 175 may inform POS 172 that the provisioning process has bee completed (block 970).

Figure 10:
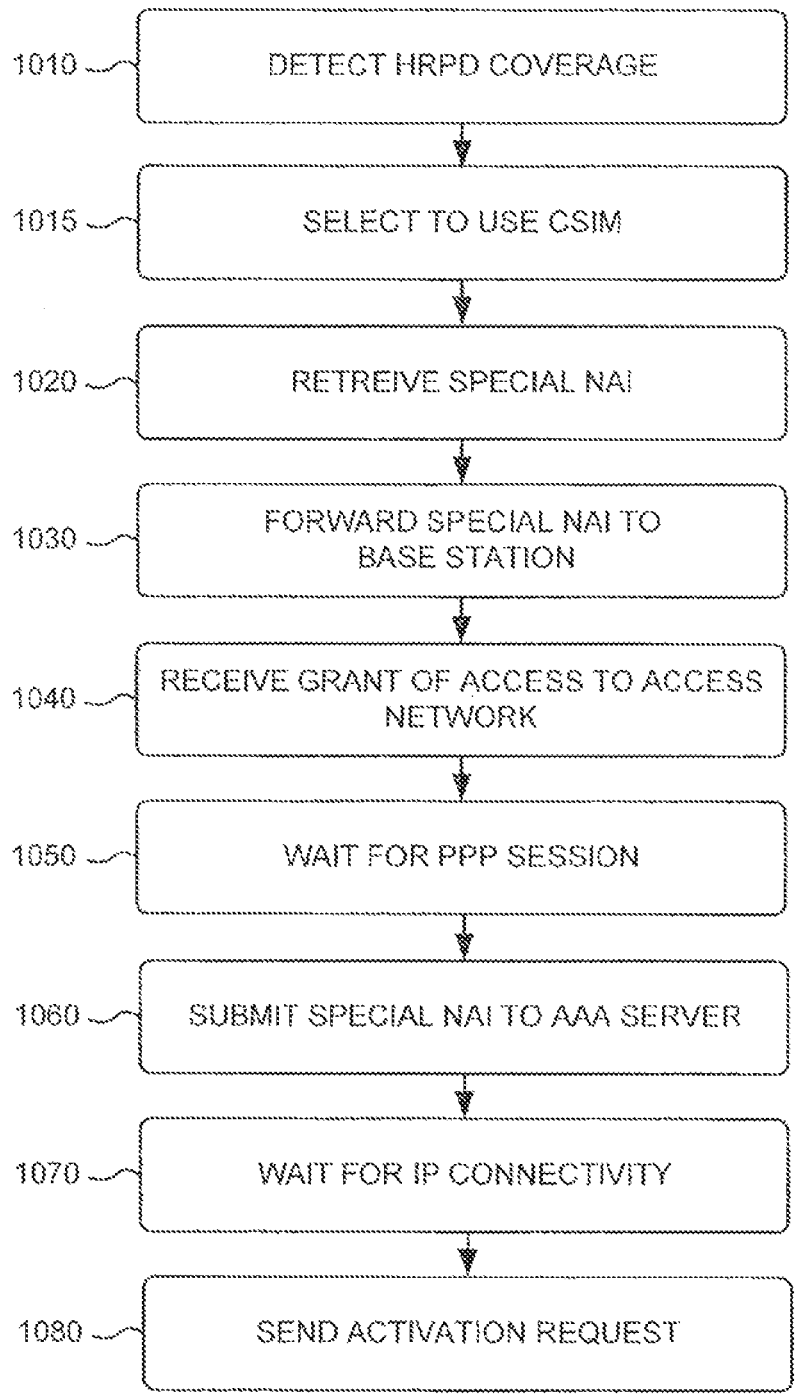
FIG. 10 is a flow diagram illustrating an example process of authentication bypass under High Rate Packet Data (HRPD) coverage, performed by the UICC, according to an implementation described herein.

FIG. 10 is a flow diagram illustrating an example process of authentication bypass under HRPD coverage according to an implementation described herein. In one implementation, the process of FIG. 10 may be performed by UICC 102. In other implementations, some or all of the process of FIG. 10 may be performed by another device or a group of devices separate from or including UICC 102.

The process of FIG. 10 may be used by UICC 102 to bypass authentication using a special network access identifier (NAI) under HRPD coverage. AAA server 154, as well as an access network AAA (AN-AAA) server may allow the special NAI to bypass authentication. An AN-AAA server (which is not shown in FIG. 1 and which is shown together with AAA server 154 in FIGS. 11 and 13) may perform AAA functions for CDMA access network 122. In one implementation, the functionality of the AN-AAA server may be performed by AAA server 154. In another implementation, AN-AAA server may be implemented separately from AAA server 154.

The process of FIG. 10 may include detecting HRPD coverage (block 1010). For example, UE 101 may power up a radio link and search for coverage. UE 101 may detect HRPD coverage by communicating with an HRPD base station, and may notify UICC 102 that HRPD coverage is available. UICC 102 may select to use CSIM 360 in response to detecting HRPD coverage (block 1015).

A special NAI may be retrieved (block 1020). For example, CSIM 360 may retrieve a special NAI from HRPD access profile field 636 of CSIM database 574. The special NAI may be forwarded to a base station (block 1030). For example, CSIM 360 may instruct UE 101 to provide the special NAI to CDMA base station 112.

A grant of access to an access network may be received (block 1040). For example, CSIM 360 may receive a grant of access, via CDMA base station 112, to access PDSN 121 of CDMA network 122. Waiting may occur for the establishment of a Point-to-Point Protocol (PPP) session (block 1050). For example, once access to PDSN 121 is granted, UE 101 may request a PPP session, and a PPP session may be set up by PDSN 121. Once the PPP session is set up, the special NAI may be submitted to AAA server 154 (block 1060). For example, CSIM 360 may instruct UE 101 to submit the special NAI to AAA server 154.

Waiting may occur for IP connectivity (block 1070). For example, once the special NAI has been submitted to the AAA server, CSIM 360 may wait for IP connectivity to be established for UE 101. An activation request may be sent (block 1080). For example, once CSIM 360 detects IP connectivity, CSIM 360 may send an activation request to programming system 190 to begin activation of UICC 102.

Figure 11:
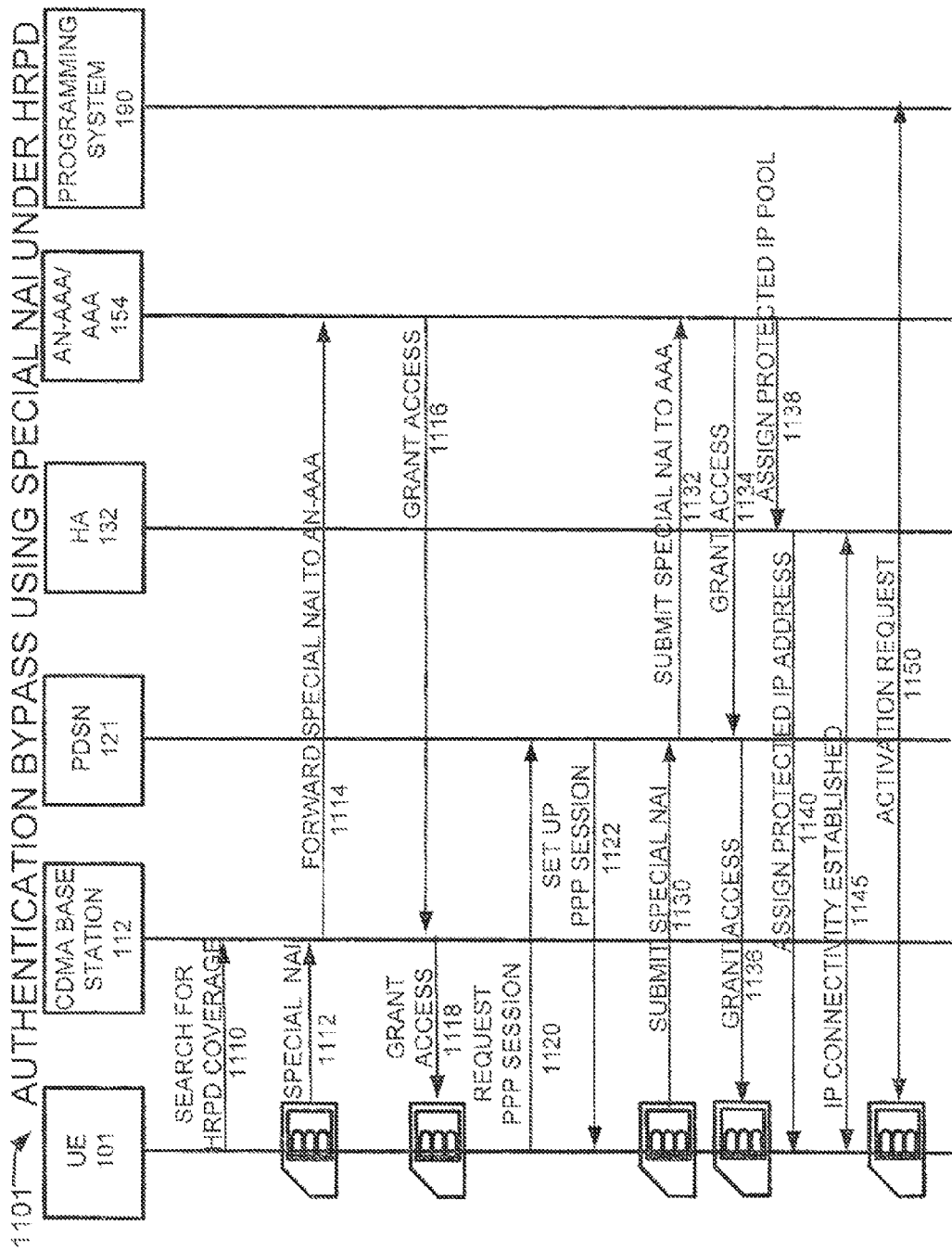
FIG. 11 is a diagram illustrating an example signal flow of the authentication bypass under HRPD coverage according to an implementation described herein.

FIG. 11 is a diagram illustrating an example signal flow 1101 of the authentication bypass under HRPD coverage according to an implementation described herein. Signal flow 1101 illustrates the processes of FIG. 10 in the context of system 100. Signal flow 1101 may include UE 101 searching for HRPD coverage and contacting CDMA base station 112, which in this case corresponds to an HRPD base station (signal 1110). After informing UICC 102 of HRPD coverage, CSIM 360 may send special NAI to CDMA base station 112 (signal 1112).

CDMA base station 112 may forward the special NAI to an AN-AAA server (signal 1114). AN-AAA server may grant access to CDMA network 122, via CDMA base station 112, to UE 101 (signals 1116 and 1118).

UE 101 may request a PPP session with PDSN 121 (signal 1120) and PDSN 121 may establish a PPP session between UE 101 and PDSN 121 (signal 1122). Once the PPP session is established, UICC 102 may be able to communicate with AAA server 154. UICC 102 may submit the special NAI to PDSN 121 (signal 1130), and PDSN 121 may submit the special NAI to AAA server 154 (signal 1132). AAA server may grant access to UE 101 via PDSN 121 (signals 1134 and 1136). Additionally, AAA server 154 may assign a protected IP pool to HA 132 (signal 1138), and HA 132 may select an IP address from the protected IP pool and assign the selected IP address to UE 101 (signal 1140). Once an IP address is assigned to UE 101, IP connectivity between UE 101 and HA 132 may be established (signal 1145). UICC 102 may now contact programming system 190 to request activation (signal 1150).

Figure 12:
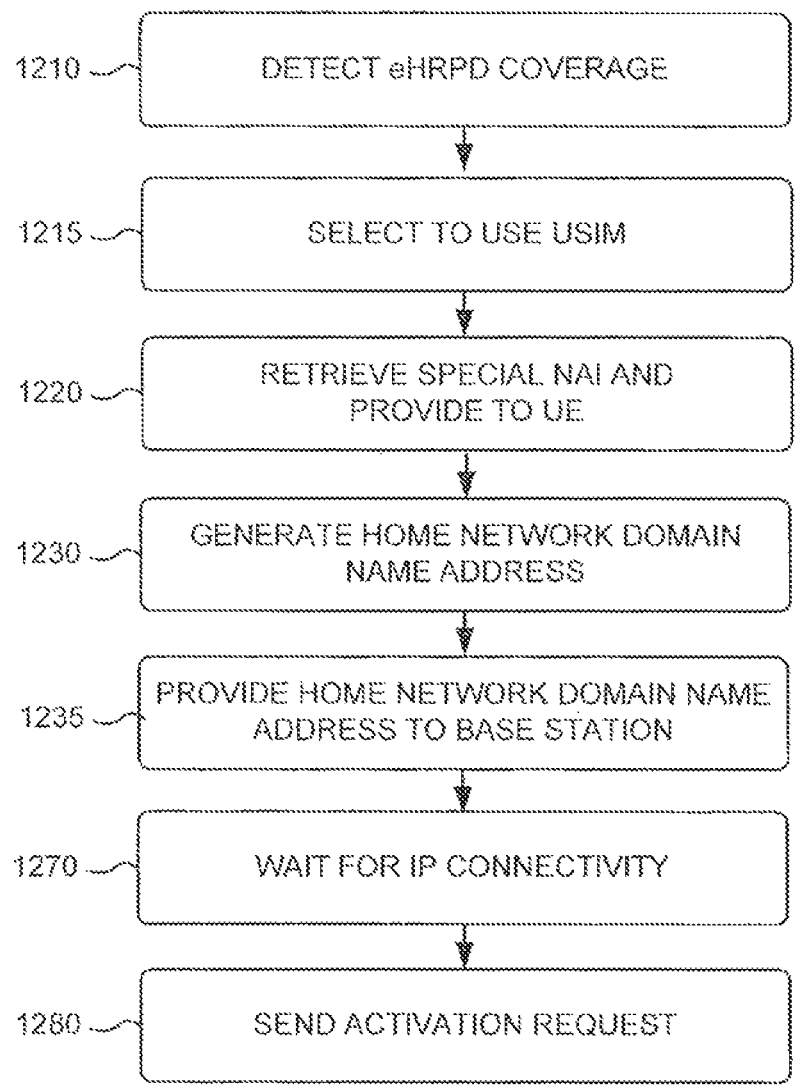
FIG. 12 is a flow diagram illustrating an example process of authentication bypass under enhanced HRPD coverage, performed by the UICC, according to an implementation described herein.

FIG. 12 is a flow diagram illustrating an example process of authentication bypass under eHRPD coverage according to an implementation described herein. In one implementation, the process of FIG. 12 may be performed by UICC 102. In other implementations, some or all of the process of FIG. 12 may be performed by another device or a group of devices separate from or including UICC 102.

The process of FIG. 12 may be used by UICC 102 to bypass authentication using a special network access identifier (NAI) under eHRPD coverage. The process of FIG. 12 may include detecting eHRPD coverage (block 1210). For example, UE 101 may power up a radio link and search for coverage. UE 101 may detect eHRPD coverage by communicating with an eHRPD base station, and may notify UICC 102 that eHRPD coverage is available. UICC 102 may select to use USIM 340 in response to detecting eHRDP coverage (block 1215).

A special network access identifier (NAI) may be retrieved and provided to UE 101 (block 1220). For example, USIM 340 may retrieve a special NAI from eHRPD access profile field 625 of USIM database record 601 and provide the special NAI to UE 101. A home network domain name address may be created based on an IMSI associated with UICC 102 (block 1230) and forwarded to the base station (block 1235).

For example, USIM 340 may generate a home network domain name address of the form 6<IMSI>@nai.epc.mcn<MNC>.mcc<MCC>.3gppnetwork.org, where <IMSI> is the IMSI associated with UICC 102, <MNC> is the mobile network code included in the IMSI, and <MCC> is the mobile country code included in the IMSI; and forward the generated home network domain name address to the base station.

Waiting may occur for IP connectivity (block 1270). For example, once the special NAI has been submitted to the base station, USIM 340 may wait for IP connectivity to be established for UE 101. An activation request may be sent (block 1280). For example, once USIM 340 detects IP connectivity, USIM 340 may send an activation request to programming system 190 to begin activation of UICC 102.

Figure 13:
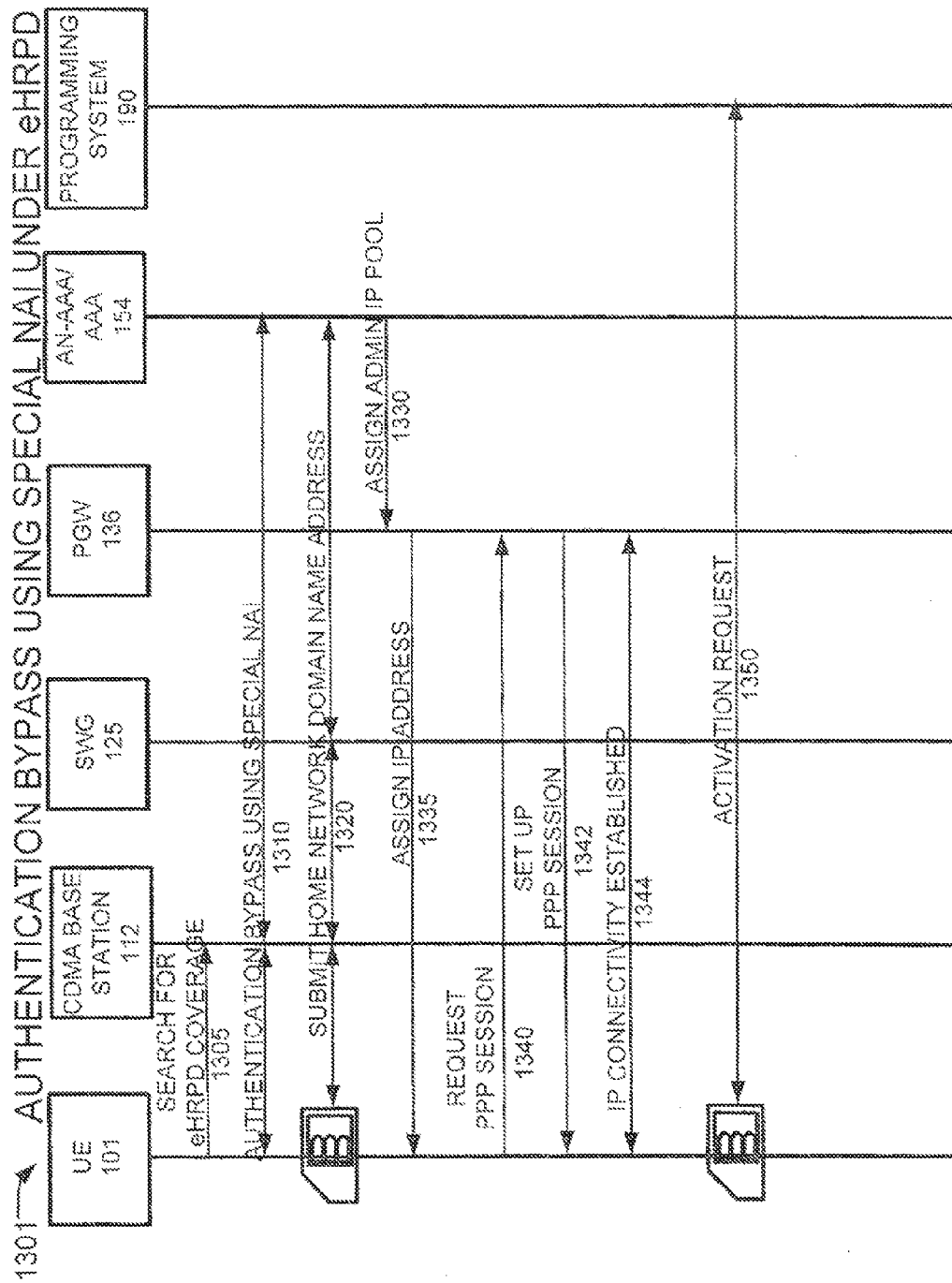
FIG. 13 is a diagram illustrating an example signal flow of the authentication bypass under eHRPD coverage according to an implementation described herein.

FIG. 13 is a diagram illustrating an example signal flow 1301 of the authentication bypass under eHRPD coverage according to an implementation described herein. Signal flow 1301 illustrates the processes of FIG. 11 in the context of system 100. Signal flow 1301 may include UE 101 searching for eHRPD coverage and contacting eNodeB 116, which in this case corresponds to an eHRPD base station (signal 1305). After informing UICC 102 of eHRPD coverage, UE 101 may send special NAI to eNodeB 116 and an authentication bypass may be set up between UE 101 and an AN-AAA server (signal 1310).

UICC 102 may now be able to contact AAA server 154 via SGW 125. UICC 102 may send a generated home network domain name address to AAA server 154 (signal 1320). Based on the received home network domain name address, AAA server 154 may assign an administrative IP pool to PGW 136 (signal 1330). PGW 136 may select an IP address from the administrative IP pool and assign the IP address to UE 101 (signal 1335).

UE 101 may request a PPP session with PGW 136 (signal 1340) and PGW 136 may set up a PPP session between UE 101 and PGW 136 (signal 1342). IP connectivity between UE 101 and PGW 136 may now be established (signal 1344). UICC 102 may now send an activation request to programming system 190 to activate UICC 102 (signal 1350).

Figure 14:
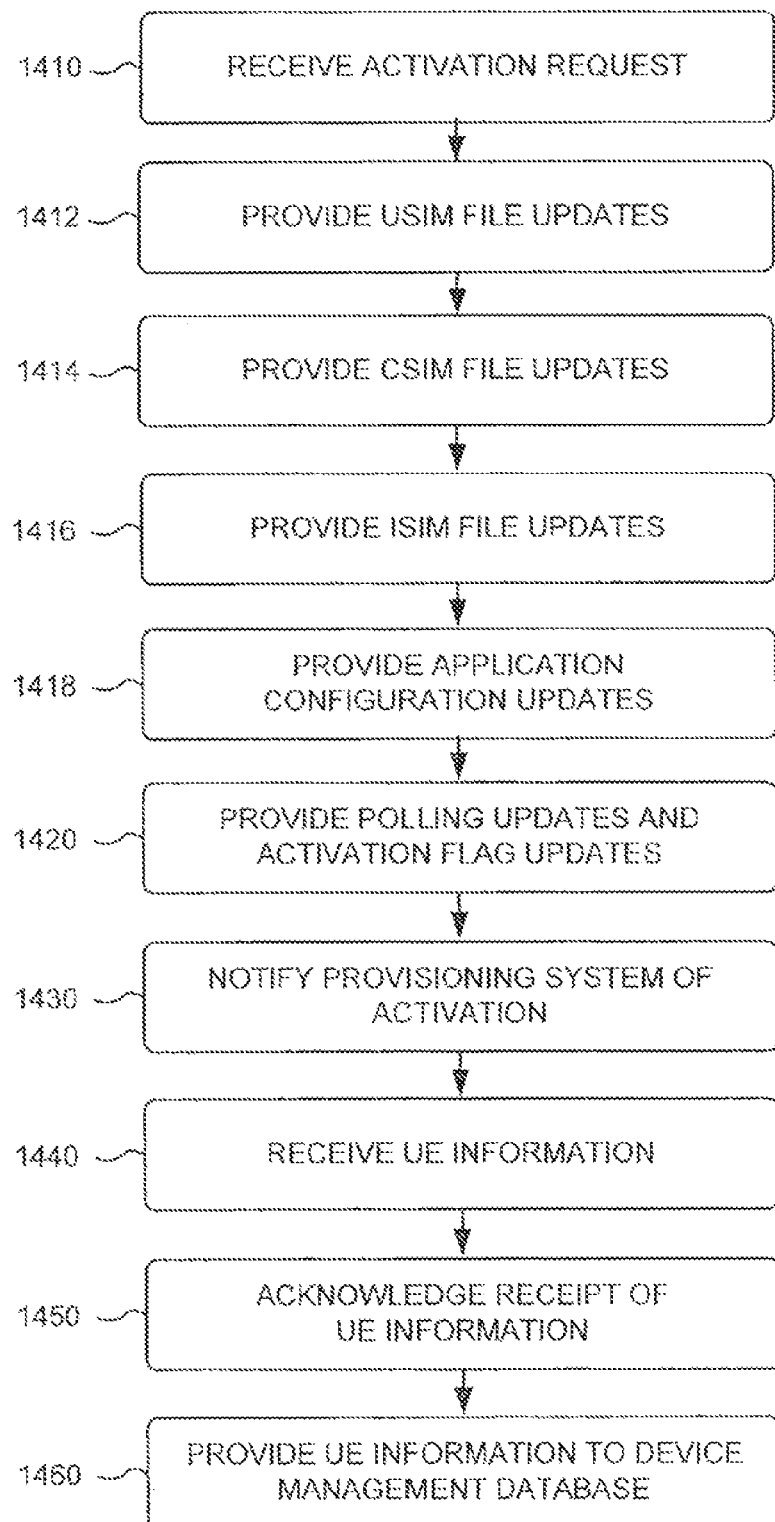
FIG. 14 is a flow diagram illustrating an example process of UICC activation, performed by the programming system, according to an implementation described herein.

FIG. 14 is a flow diagram illustrating an example process of UICC activation according to an implementation described herein. In one implementation, the process of FIG. 14 may be performed by programming system 190. In other implementations, some or all of the process of FIG. 14 may be performed by another device or a group of devices separate from or including programming system 190.

The process of FIG. 14 may include receiving an activation request (block 1410). For example, programming system 190 may receive a request from UICC 102 to program UICC 102. The activation request may include the ICCID associated with UICC 102.

USIM file updates may be provided (block 1412). For example, programming system 190 may provide USIM file updates to UICC 102. The USIM file updates may include, for example, updates to any fields of USIM database 572.

CSIM file updates may be provided (block 1414). For example, programming system 190 may provide CSIM file updates to UICC 102. The CSIM file updates may include, for example, updates to any fields of CSIM database 574.

ISIM file updates may be provided (block 1416). For example, programming system 190 may provide ISIM file updates to UICC 102. The ISIM file updates may include, for example, updates to any fields of ISIM database 572.

Application configuration updates may be provided (block 1418). For example, programming system 190 may provide application configuration updates to UICC 102. Application configuration updates may include, for example, updates to any fields of application configuration database 578.

Polling updates and activation flag updates may be provided (block 1420). For example, programming system 190 may provide polling updates and activation flag updates that indicate particular conditions that may cause UICC 102 to request updates from programming system 190. The particular conditions may include, for example, particular intervals at which updates are to be performed, or particular trigger events that may cause UICC 102 to request an update. Additionally, programming system 190 may instruct UICC 102 to set an activation flag to indicate that UICC 102 has been activated.

Provisioning system 180 may be notified of activation (block 1430). Once all file updates have been provided to UICC 102, programming system 190 may send a notification to provisioning system 180 that UICC 102 has been activated. The notification may include, for example, the ICCID associated with UICC 102, the MSISDN, and a report of the update results that were obtained by programming system 190.

UE information may be received (block 1440). For example, programming system 190 may receive, from UICC 102, information about UE 101. The information may include, for example, information from UE database 565, such as the ICCID associated with UICC 102, the IMEI or IMEI_SV associated with UE 101, the IMSI associated with UICC 102, and a terminal profile associated with UE 101.

Receipt of UE information may be acknowledged (block 1450). For example, programming system 190 may send an acknowledgement to UICC 102, indicating that the UE information has been received.

The UE information may be provided to DMD 171 (block 1460). For example, programming system 190 may send a device change notification to DMD 171, indicating a new UE 101 is associated with UICC 102. The device change notification may include, for example, the ICCID associated with UICC 102, the IMEI or IMEI_SV associated with UE 101, an old IMEI or IMEI_SV previously associated with UICC 102, the IMSI, the MIN, and the terminal profile.

Figure 15A:
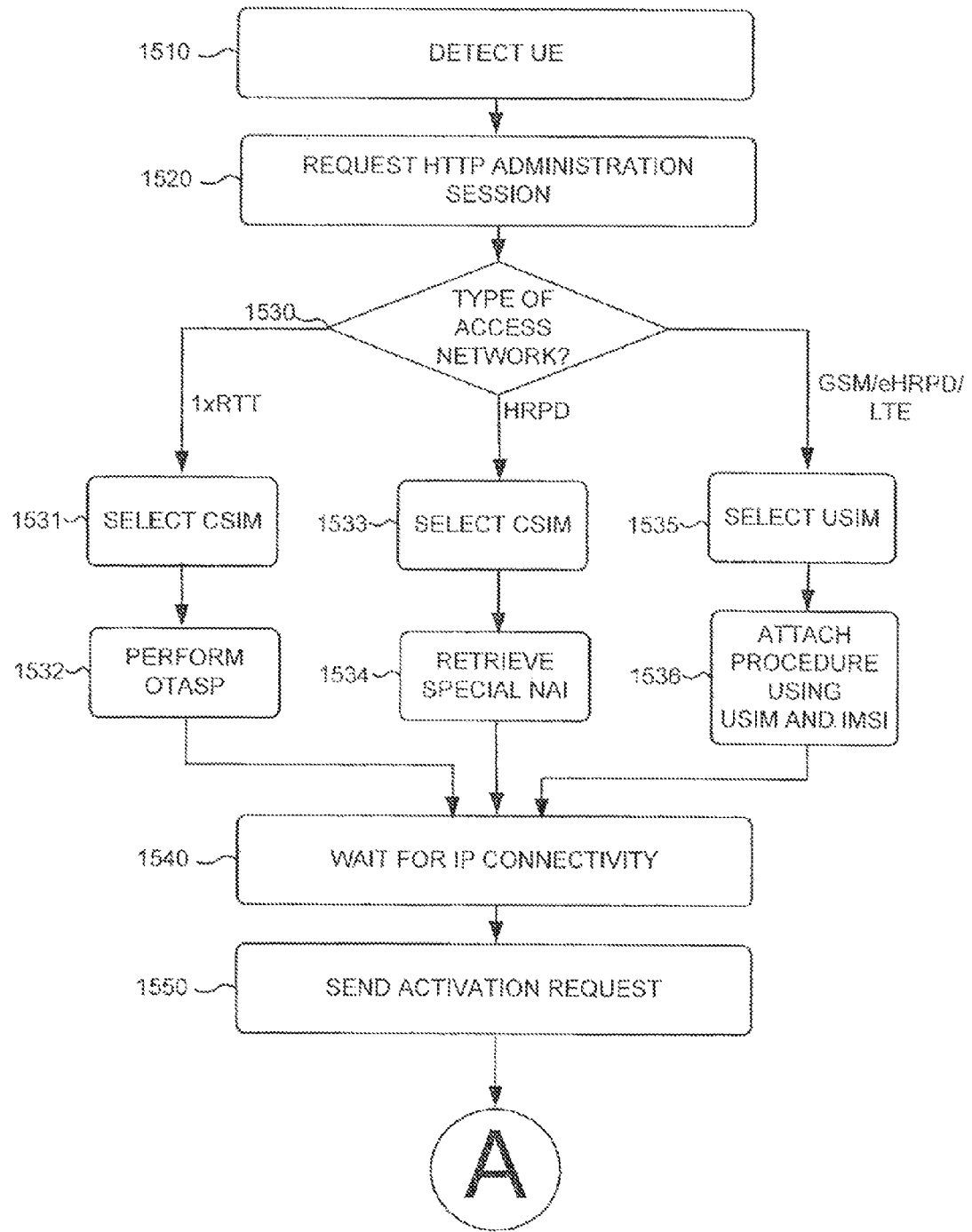
FIGS. 15A and 15B are flow diagrams illustrating an example process of UICC activation, performed by the UICC, according to an implementation described herein.
Figure 15B:
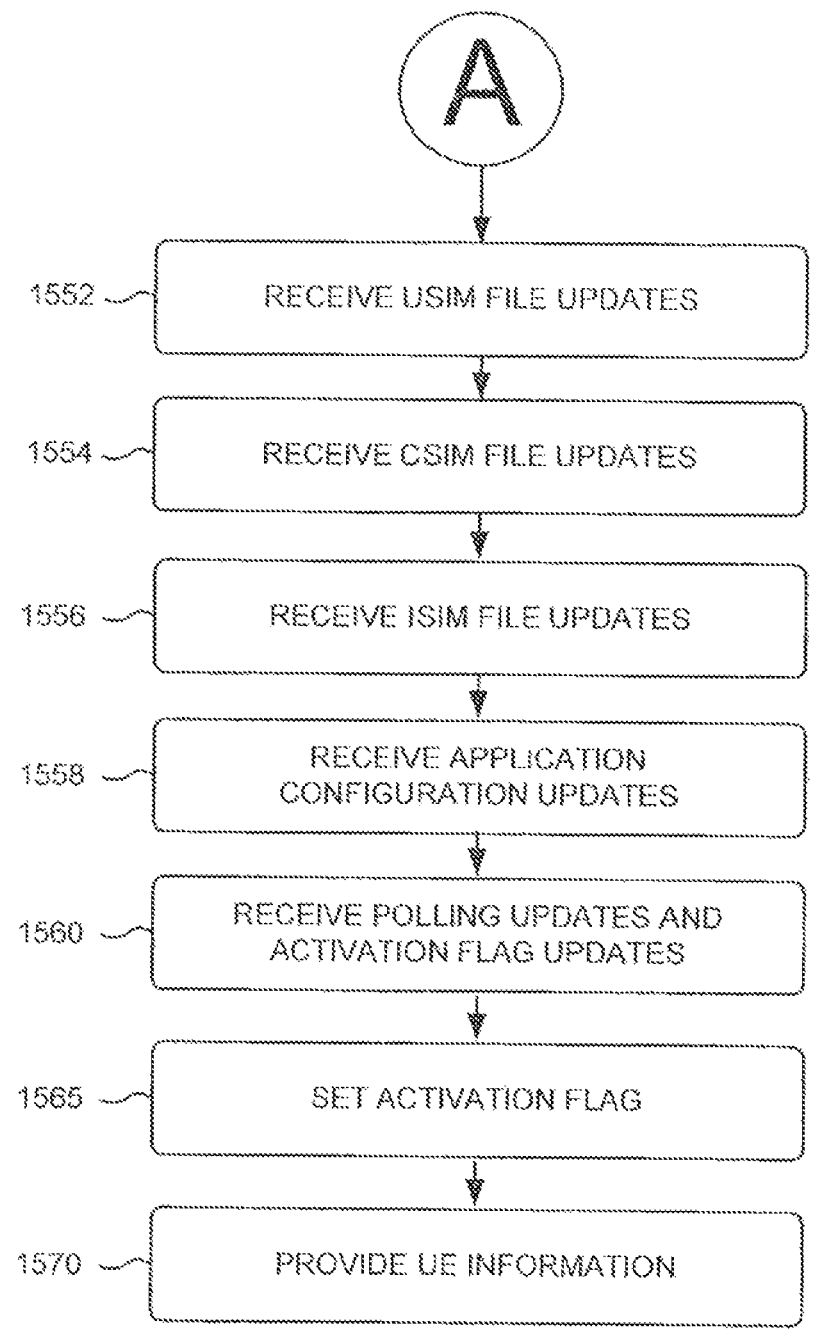

FIGS. 15A and 15B are flow diagrams illustrating an example process of UICC activation according to an implementation described herein. In one implementation, the process of FIGS. 15A and 15B may be performed by UICC 102. In other implementations, some or all of the process of FIGS. 15A and 15B may be performed by another device or a group of devices separate from or including UICC 102.

The process of FIG. 15A may include detecting a UE (block 1510). For example, when UICC 102 is placed into UE 101 and UE 101 is powered on, UICC 102 may detect that it has been placed in a new device. A new HTTP administration session may be requested (block 1520). For example, UICC 102 may request UE 101 to set up an HTTP administration session with core network 140 so that UICC 102 may be activated.

A type of access network may be determined (block 1530). For example, UICC 102 may query UE 101 to determine what kind of coverage is available. UE 101 may power up an RF transceiver and scan for base stations. Once UE 101 has detected a base station, UE 101 may identify a type of base station and provide information about the base station to UICC 102. If more than one type of access network is detected, UICC 102 may select one of the detected access network based on a prioritized list of access networks. For example, UICC 102 may give preference to an LTE access network over other access networks, may give preference to a GSM network over a CDMA network, may give preference to a CDMA eHRPD network over other types of CDMA networks, and may give preference to a CDMA HRPD network over a CDMA 1×RTT network.

If an 1×RTT base station is detected (block 1530—1×RTT), CSIM 360 may be selected for activation (block 1531) and over the air service provisioning (OTASP) may be performed (block 1532). For example, card activation component 570 may select CSIM 360 to be used for activation and CSIM 360 may retrieve an OTAF number stored in 1×RTT profile field 635 of CSIM database 572. The OTAF number may be provided to UE 101 and may be used to contact OTAF 162. OTAF 162 may perform an OTASP transaction, which may include providing UICC 102 with a mobile IMSI (IMSI_M). The provided IMSI_M may be used by UICC 102 to perform HLR authentication by contacting HLR 152. Once HLR 152 is contacted, waiting for IP connectivity may occur (block 1540).

If an HRPD base station is detected (block 1530—HRPD), CSIM 360 may be selected for activation (block 1533) and a special NAI may be retrieved (block 1534). For example, card activation component 570 may select CSIM 360 to be used for activation and CSIM 360 may retrieve a special NAI stored in HRPD profile field 636 of CSIM database 572. The special NAI may be provided to UE 101 and waiting for IP connectivity may occur (block 1540).

If a GSM, eHRPD, or an LTE base station is detected (block 1530—GSM/eHRPD/LTE), USIM 340 may be selected for activation (block 1535) and an attach procedure using USIM and IMSI may be performed (block 1536). For example, UICC 102 may provide the IMSI to UE 101 and waiting for IP connectivity may occur (block 1540).

Once IP connectivity is established, an activation request may be sent (block 1550). For example, UICC 102 may send an activation request to programming system 190 to activate UICC 102.

Continuing at FIG. 15B, USIM file updates may be received (block 1552). For example, USIM 340 may receive USIM file updates and store the updates in USIM database 572. The USIM file updates may include, for example, updates to any fields of USIM database 572.

CSIM file updates may be received (block 1554). For example, CSIM 360 may receive CSIM file updates and store the updates in CSIM database 574. The CSIM file updates may include, for example, updates to any fields of CSIM database 574.

ISIM file updates may be received (block 1556). For example, ISIM 350 may receive ISIM file updates and store the updates in ISIM database 576. The ISIM file updates may include, for example, updates to any fields of ISIM database 576.

Application configuration updates may be received (block 1558). For example, UICC 102 may receive application configuration updates and store the updates in application configuration database 578. Application configuration updates may include, for example, updates to any fields of application configuration database 578.

Polling updates and activation flag updates may be received (block 1560). For example, UICC 102 may receive polling updates that indicate particular conditions that may cause UICC 102 to request activation and/or updates from programming system 190. The particular conditions may include, for example, particular intervals at which updates are to be performed, or particular trigger events that may cause UICC 102 to request an update. The received polling updates may be stored in polling database 585. Additionally, UICC 102 may receive an indication from programming system 190 that activation has been completed and that the activation flag should be set. The activation flag may be set (block 1565). For example, card activation component 570 may set the activation flag stored in activation flag field 604, indicating that UICC 102 is now activated.

UE information may be provided (block 1570). For example, device information component 560 may provide UE information from UE database 565 to programming system 190. The information may include, for example, the ICCID associated with UICC 102, the IMEI or IMEI_SV associated with UE 101, the IMSI associated with UICC 102, and a terminal profile associated with UE 101.

Figure 16A:
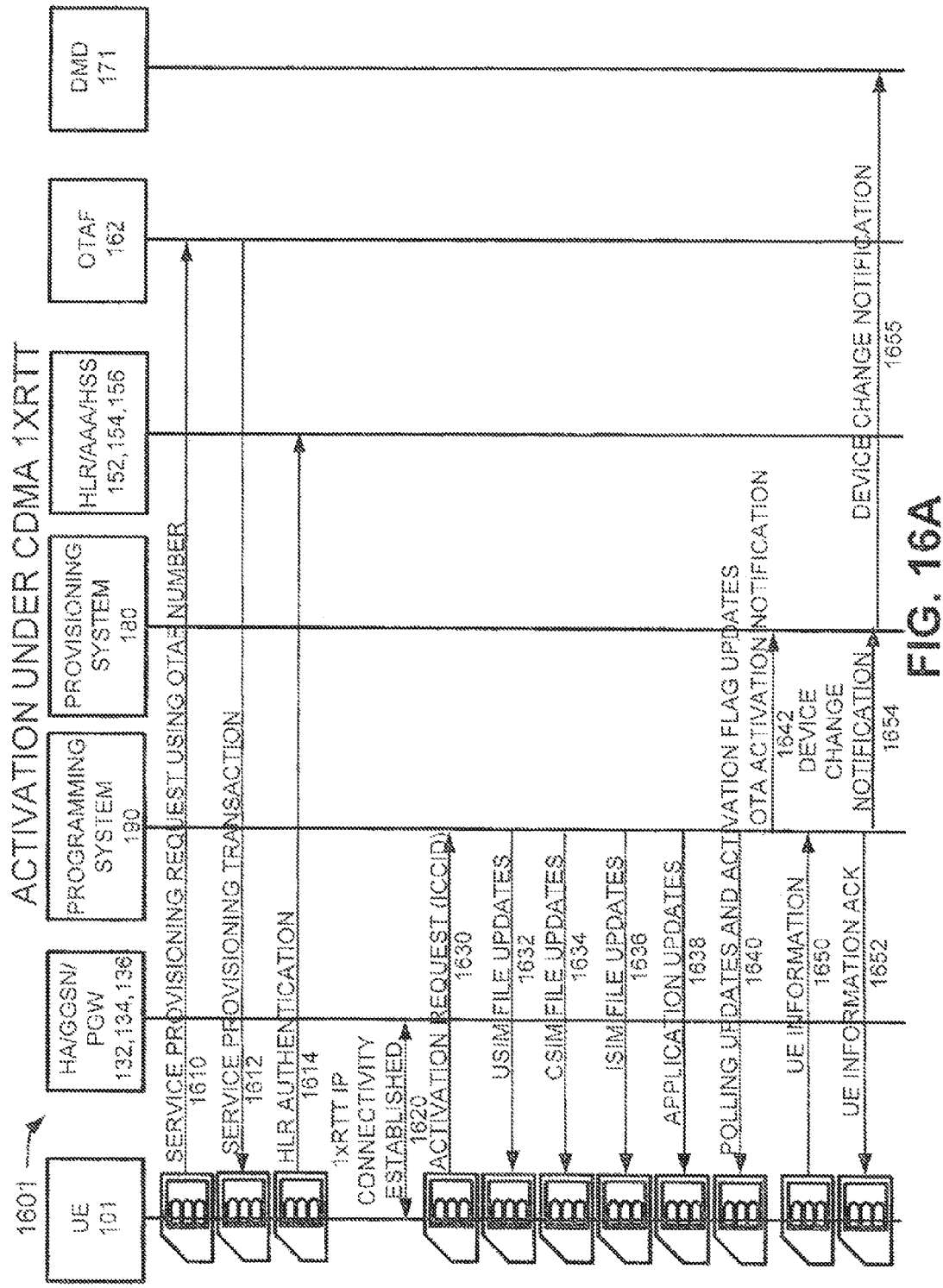
FIG. 16A is a diagram illustrating an example signal flow of UICC activation under CDMA one times radio transmission technology (1×RTT) coverage according to an implementation described herein.

FIG. 16A is a diagram illustrating a first example signal flow 1601 of UICC activation according to an implementation described herein. Signal flow 1601 illustrates the process of FIGS. 15A and 15B, under CDMA 1×RTT coverage, in the context of system 100. Signal flow 1601 may include UICC 102 sending a service provisioning request, using an OTAF number, to OTAF 162 (signal 1610). OTAF 162 may perform a service provisioning transaction by providing UICC 102 with IMSI_M, which may be used by UICC 102 for HRL authentication (signal 1612). UICC 102 may provide HLR 152 with the provided IMSI_M and HLR 152 may perform HLR authentication (signal 1614).

Once HLR authentication is completed, 1×RTT connectivity may be established between UE 101 and HA 132 (signal 1620). UICC 102 may send an activation request, which may include the ICCID, to programming system 190 (signal 1630). Programming system 190 may provide UICC 102 with USIM file updates (signal 1632), CSIM file updates (signal 1634), ISIM file updates (signal 1636), application configuration updates (signal 1638), and polling updates and activation flag updates (signal 1640). Once the updates are performed, programming system 190 may send a notification to provisioning system 180 that UICC activation has been completed (signal 1642). The notification may include, for example, the ICCID associated with UICC 102, the IMEI or IMEI_SV associated with UE 101, the IMSI associated with UICC 102, and a terminal profile associated with UE 101.

UICC 102 may provide UE information from UE database 565 to programming system 190 (signal 1650). The information may include, for example, the ICCID associated with UICC 102, the IMEI or IMEI_SV associated with UE 101, the IMSI associated with UICC 102, and a terminal profile associated with UE 101. Programming system 190 may send an acknowledgement back to UICC 102, indicating that the UE information has been received (signal 1652). Programming system 190 may send a device change notification provisioning system 180 (signal 1654), and provisioning system 180 may forward the device change notification to DMD 171, indicating a new UE 101 is associated with UICC 102 (signal 1655). The device change notification may include the ICCID associated with UICC 102, the IMEI or IMEI_SV associated with UE 101, an old IMEI or IMEI_SV previously associated with UICC 102, the IMSI, the MIN, and the terminal profile.

Figure 16B:
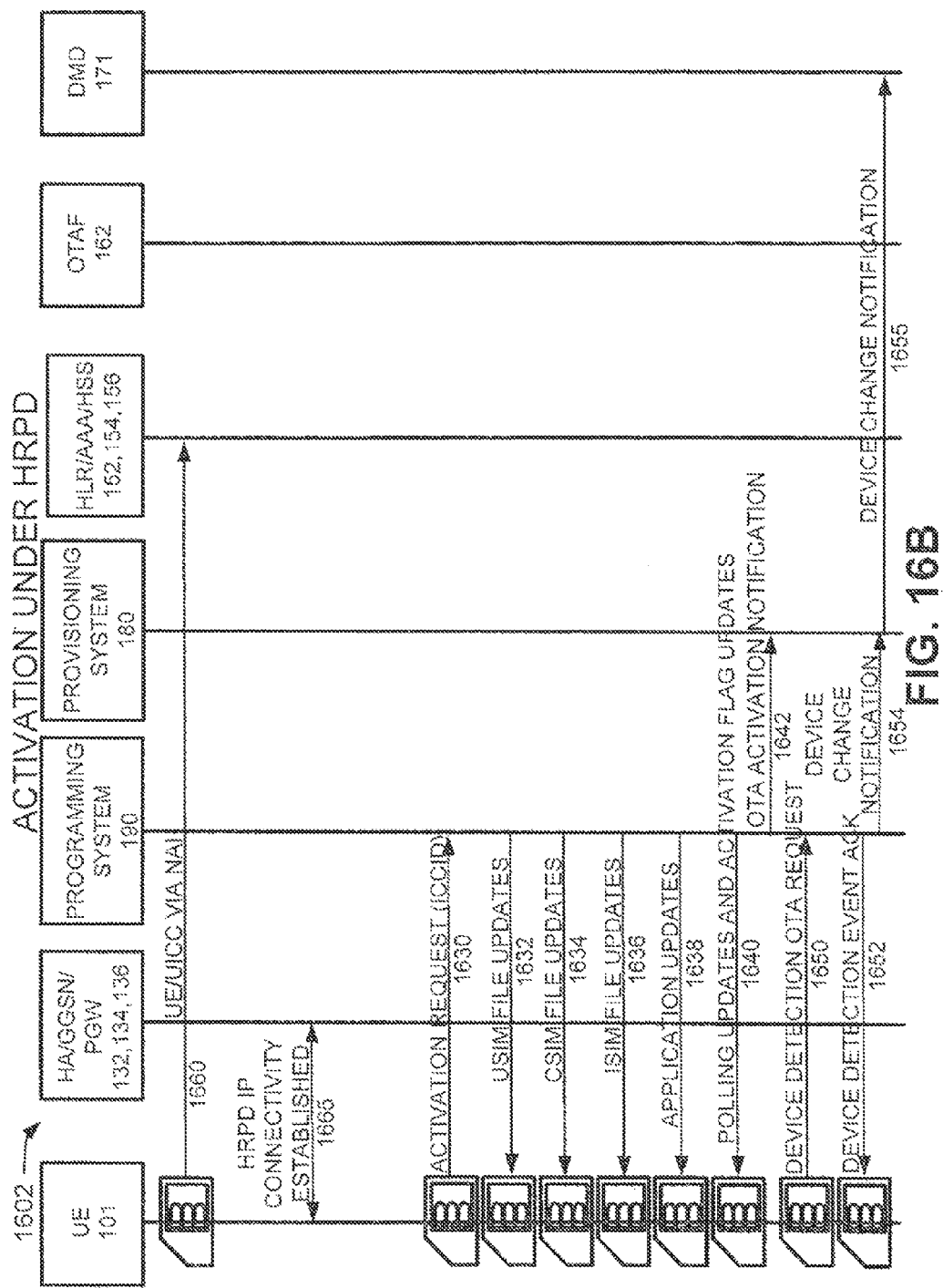
FIG. 16B is a diagram illustrating an example signal flow of UICC activation under HRPD coverage according to an implementation described herein.

FIG. 16B is a diagram illustrating a second example signal flow 1602 of UICC activation according to an implementation described herein. Signal flow 1602 illustrates the process of FIGS. 15A and 15B, under CDMA HRPD coverage, in the context of system 100. Signal flow 1602 may include UICC 102 sending a special NAI to AAA server 154 (signal 1660). The special NAI may allow UICC 102 to bypass normal authentication procedures and may cause AAA server 154 to assign an administrative IP pool to HA 132. HA 132 may assign an IP address to UE 101 from the administrative IP pool and HRPD IP connectivity may be established between UE 101 and HA 132 (signal 1665). After HRPD connectivity is established, UICC activation may proceed similarly to that shown in FIG. 16A.

Figure 16C:
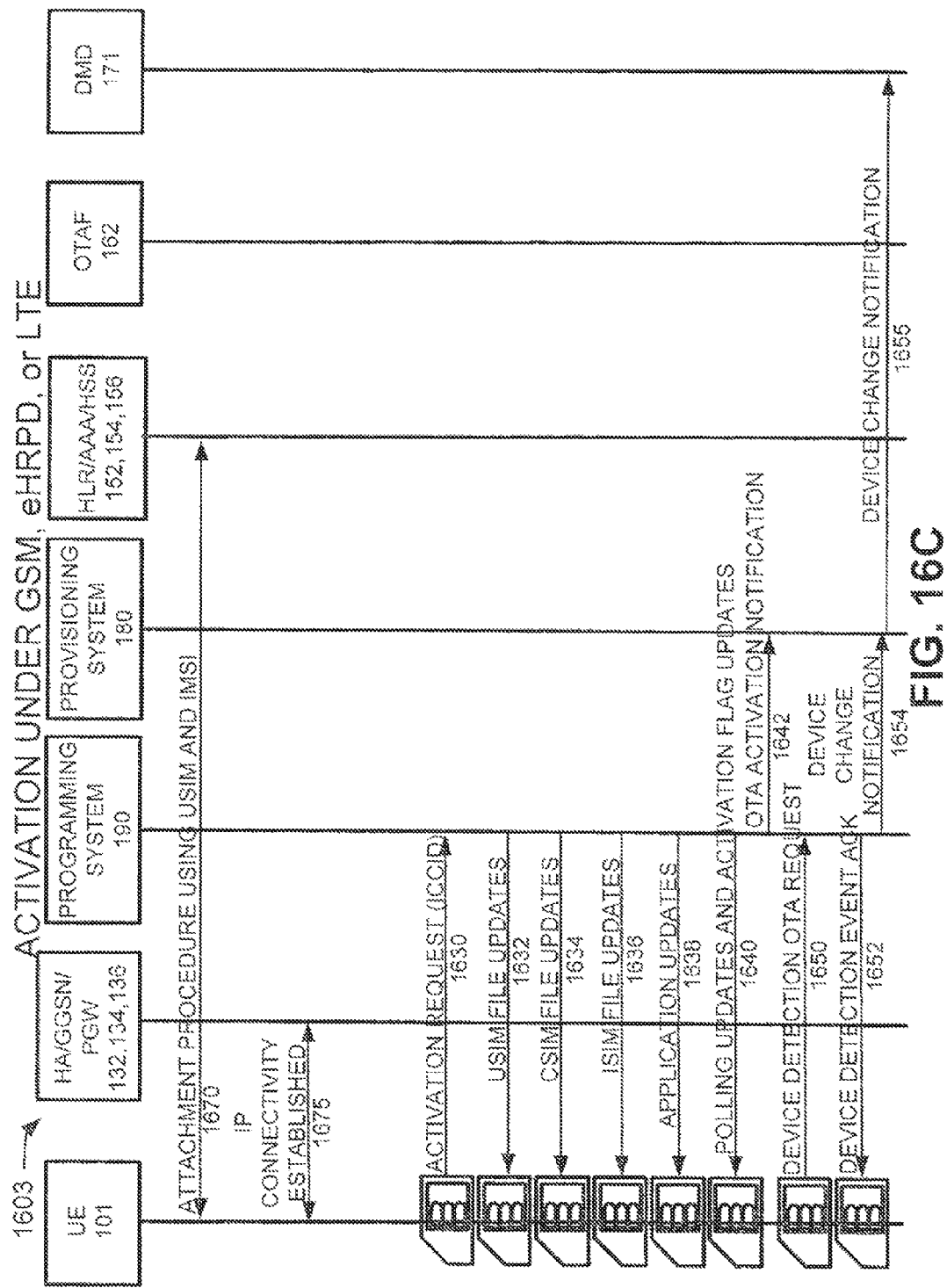
FIG. 16C is a diagram illustrating an example signal flow of UICC activation under Long Term Evolution (LTE) or eHRPD coverage according to an implementation described herein.

FIG. 16C is a diagram illustrating a third example signal flow 1603 of UICC activation according to an implementation described herein. Signal flow 1603 illustrates the process of FIGS. 15A and 15B under GSM, eHRPD, or LTE coverage, in the context of system 100. Signal flow 1603 may include UE 101 performing an attachment procedure using USIM 340 and IMSI (signal 1670). Under GSM coverage, the attachment procedure may include, for example, sending an attach request to GSM base station 114 and performing an authentication procedure between UE 101 and HLR 152. Under eHRPD or LTE coverage, the attachment procedure may include, for example, sending an attach request to an eHRPD or LTE base station (e.g., eNodeB 116), performing an authentication procedure between UE 101 and HSS 156, and establishing a default bearer between UE 101 and PGW 136. Once a default bearer is established between UE 101 and PGW 136, IP connectivity is established between UE 101 and PGW 136 (signal 1675). After GSM, eHRPD, or LTE IP connectivity is established, UICC activation may proceed similarly to that shown in FIG. 16A.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7, 8, 10, 12, 14, 15A, and 15B, the order of the blocks may be modified in other implementations. Further, non-dependent blocks may be performed in parallel.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A universal integrated circuit card comprising:
    a universal subscriber identity module;
    a code division multiple access subscriber identity module;
    a memory to store instructions; and
    a processor to execute the instructions to:
        detect a base station;
        identify a type of base station associated with the detected base station;
        determine a type of wireless access network available to a user equipment, associated with the universal integrated circuit card, based on the identified type of base station;
        perform activation of the universal integrated circuit card using the universal subscriber identity module, in response to detecting a code division multiple access enhanced High Rate Packet Data network, a Global System for Mobile Communication access network, or a Long Term Evolution access network, wherein the activation includes obtaining a universal subscriber identity module file update and a code division multiple access subscriber identity module file update from a programming system;
        perform activation of the universal integrated circuit card using the code division multiple access subscriber identity module, in response to detecting an available code division multiple access access network other than a code division multiple access enhanced High Rate Packet Data access network, wherein the activation includes obtaining the universal subscriber identity module file update and the code division multiple access subscriber identity module file update from the programming system; and
        set an activation flag when activation of the universal integrated circuit card is complete.

2. The universal integrated circuit card of claim 1, further comprising:
    a user equipment database that stores:
        an identification string associated with the universal subscriber identity module;
        an identification string associated with the user equipment associated with the universal subscriber identity module; and
        a user equipment profile that stores information about the user equipment associated with the universal subscriber identity module.

3. The universal integrated circuit card of claim 1, where the processor is further to:
    retrieve information about the user equipment associated with the universal subscriber identity module by communicating with the user equipment, in response to the user equipment being powered up.

4. The universal integrated circuit card of claim 1, where the universal subscriber identity module stores one or more of:
    a Mobile Subscriber Integrated Services Digital Network number,
    an International Mobile Subscriber Identity number,
    information identifying a Home Public Land Mobile Network, or
    a mobile country code list.

5. The universal integrated circuit card of claim 4, where the universal integrated circuit card is to use the universal subscriber identity module and the International Mobile Subscriber Identity number when the user equipment, associated with the universal subscriber identity module, is to perform an attachment procedure in the Global System for Mobile Communication access network or the Long Term Evolution access network.

6. The universal integrated circuit card of claim 1, where the code division multiple access subscriber identity module stores one or more of:
    a Mobile Identification Number,
    a Mobile Directory Number, a 1XRTT access profile, or a High Rate Packet Data access profile.

7. The universal integrated circuit card of claim 6, where the universal integrated circuit card is to use the code division multiple access subscriber identity module and the Mobile Identification Number when the user equipment, associated with the universal subscriber identity module, is to perform an attachment procedure in a code division multiple access access network other than the code division multiple access enhanced High Rate Packet Data access network.

8. The universal integrated circuit card of claim 6, where the processor is further to:

detect a code division multiple access 1XRTT access network;

retrieve an over the air function number from the 1XRTT access profile;

contact an over the air function using the retrieved over the air function number;

wait for Internet Protocol connectivity to be established between the user equipment, associated with the universal subscriber identity module, and a home agent associated with the code division multiple access 1XRTT access network; and send an activation request to a programming system to activate the universal subscriber identity module.

9. The universal integrated circuit card of claim 6, where the processor is further to:

detect a code division multiple access High Rate Packet Data access network;

retrieve a special network access identifier from the High Rate Packet Data access profile;

send the special network access identifier to an authentication, authorization, and accounting server;

wait for Internet Protocol connectivity to be established between the user equipment, associated with the universal subscriber identity module, and a home agent associated with the code division multiple access High Rate Packet Data access network; and send an activation request to a programming system to activate the universal subscriber identity module.

10. The universal integrated circuit card of claim 1, where the processor is further to:

send an activation request to the programming system;

receive, from the programming system, the universal subscriber identity module file update;

receive, from the programming system, the code division multiple access subscriber identity module file update; and receive, from the programming system, an application configuration update, wherein the application configuration update is to be used with applications associated with the user equipment, associated with the universal subscriber identity module.

11. The universal integrated circuit card of claim 1, where the universal subscriber identity module further comprises an Internet Protocol Multimedia Subsystem subscriber identity module, where the universal subscriber identity module is to use the Internet Protocol Multimedia Subsystem subscriber identity module when communication with an Internet Protocol Multimedia Subsystem network, and where the processor is further to:

receive, from the programming system, Internet Protocol Multimedia Subsystem subscriber identity module file updates.

12. A method performed by a universal integrated circuit card, the method comprising:

detecting, by a processor associated with the universal integrated circuit card, a base station;

identifying, by the processor, a type of base station associated with the detected base station;

determining, by the processor, a type of wireless access network available to a user equipment, associated with the universal integrated circuit card, based on the identified type of base station;

performing, by the processor, activation of the universal integrated circuit card using a universal subscriber identity module, in response to detecting a code division multiple access enhanced High Rate Packet Data network, a Global System for Mobile Communication access network, or a Long Term Evolution access network, wherein the activation includes obtaining a universal subscriber identity module file update and a code division multiple access subscriber identity module file update from a programming system;

performing, by the processor, activation of the universal integrated circuit card using a code division multiple access subscriber identity module, in response to detecting an available code division multiple access access network other than a code division multiple access enhanced High Rate Packet Data access network, wherein the activation includes obtaining the universal subscriber identity module file update and the code division multiple access subscriber identity module file update from the programming system; and set, by the processor, an activation flag when activation of the universal integrated circuit card is complete.

13. The method of claim 12, where performing activation of the universal integrated circuit card using the universal subscriber identity module comprises:

performing an attachment procedure using the universal subscriber identity module and an International Mobile Subscriber Identity number associated with the universal subscriber identity module;

waiting for Internet Protocol connectivity to be established between the user equipment, associated with the universal subscriber identity module, and a packet data network gateway;

sending, in response to detecting Internet Protocol connectivity, an activation request to the programming system;

receiving, from the programming system, the universal subscriber identity module file update;

receiving, from the programming system, the code division multiple access subscriber identity module file update;

receiving, from the programming system, an Internet Protocol Multimedia Subsystem subscriber identity module file update; and receiving, from the programming system, an application configuration update, wherein the application configuration update is to be used with an application associated with the user equipment, associated with the universal subscriber identity module.

14. The method of claim 12, where performing activation of the universal integrated circuit card using the code division multiple access subscriber identity module comprises:

detecting a code division multiple access 1XRTT access network;

contacting an over the air function using an over the air function number;

waiting for Internet Protocol connectivity to be established between the user equipment, associated with the universal subscriber identity module, and a home agent associated with the code division multiple access 1XRTT access network;

sending, in response to detecting Internet Protocol connectivity, an activation request to the programming system;

receiving, from the programming system, the universal subscriber identity module file update;

receiving, from the programming system, the code division multiple access subscriber identity module file update;

receiving, from the programming system, an Internet Protocol Multimedia Subsystem subscriber identity module file update; and receiving, from the programming system, an application configuration update, wherein the application configuration update is to be used with an application associated with the user equipment, associated with the universal subscriber identity module.

15. The method of claim 12, where performing activation of the universal integrated circuit card using the code division multiple access subscriber identity module comprises:

detecting a code division multiple access High Rate Packet Data access network;

sending a special network access identifier to an authentication, authorization, and accounting server;

waiting for Internet Protocol connectivity to be established between the user equipment, associated with the universal subscriber identity module, and a home agent associated with the code division multiple access High Rate Packet Data access network;

sending an activation request to the programming system;

receiving, from the programming system, the universal subscriber identity module file update;

receiving, from the programming system, the code division multiple access subscriber identity module file update;

receiving, from the programming system, an Internet Protocol Multimedia Subsystem subscriber identity module file update; and receiving, from the programming system, an application configuration update, wherein the application configuration update is to be used with an application associated with the user equipment, associated with the universal subscriber identity module.

16. One or more computer-readable memory devices storing instructions executable by one or more processors, the one or more computer-readable memory devices comprising:

one or more instructions to detect a base station;

one or more instructions to identify a type of base station associated with the detected base station;

one or more instructions to determine a type of wireless access network available to a user equipment, associated with a universal integrated circuit card, based on the identified type of base station;

one or more instructions to perform activation of the universal integrated circuit card using a universal subscriber identity module, in response to detecting a code division multiple access enhanced High Rate Packet Data network, a Global System for Mobile Communication access network, or a Long Term Evolution access network, wherein the activation includes obtaining a universal subscriber identity module file update and a code division multiple access subscriber identity module file update from a programming system;

one or more instructions to perform activation of the universal integrated circuit card using a code division multiple access subscriber identity module, in response to detecting an available code division multiple access access network other than a code division multiple access enhanced High Rate Packet Data access network, wherein the activation includes obtaining the universal subscriber identity module file update and the code division multiple access subscriber identity module file update from the programming system; and one or more instructions to set an activation flag when activation of the universal integrated circuit card is complete.

17. The one or more computer-readable memory devices of claim 16, where the one or more instructions to perform the activation of the universal integrated circuit card comprises:

one or more instructions to receive, from the programming system, the universal subscriber identity module file update;

one or more instructions to receive, from the programming system, the code division multiple access subscriber identity module file update;

one or more instructions to receive, from the programming system, an Internet Protocol Multimedia Subsystem subscriber identity module file update; and one or more instructions to receive, from the programming system, an application configuration update, wherein the application configuration update is to be used with an application associated with the user equipment, associated with the universal subscriber identity module.

18. The one or more computer-readable memory devices of claim 17, where the universal subscriber identity module file update includes one or more of:

a Mobile Subscriber Integrated Services Digital Network number, an International Mobile Subscriber Identity number, information identifying a Home Public Land Mobile Network, or a mobile country code list.

19. The one or more computer-readable memory devices of claim 17, where the code division multiple access subscriber identity module file update includes one or more of:

a Mobile Identification Number, a Mobile Directory Number, a 1XRTT access profile, or a High Rate Packet Data access profile.

20. The one or more computer-readable memory devices of claim 17, where the Internet Protocol Multimedia Subsystem subscriber identity module file update includes one or more of:

a public Internet Protocol Multimedia Subsystem subscriber identity; or a private Internet Protocol Multimedia Subsystem subscriber identity.

* * * * *